United States Patent Office 2,738,819
Patented Mar. 20, 1956

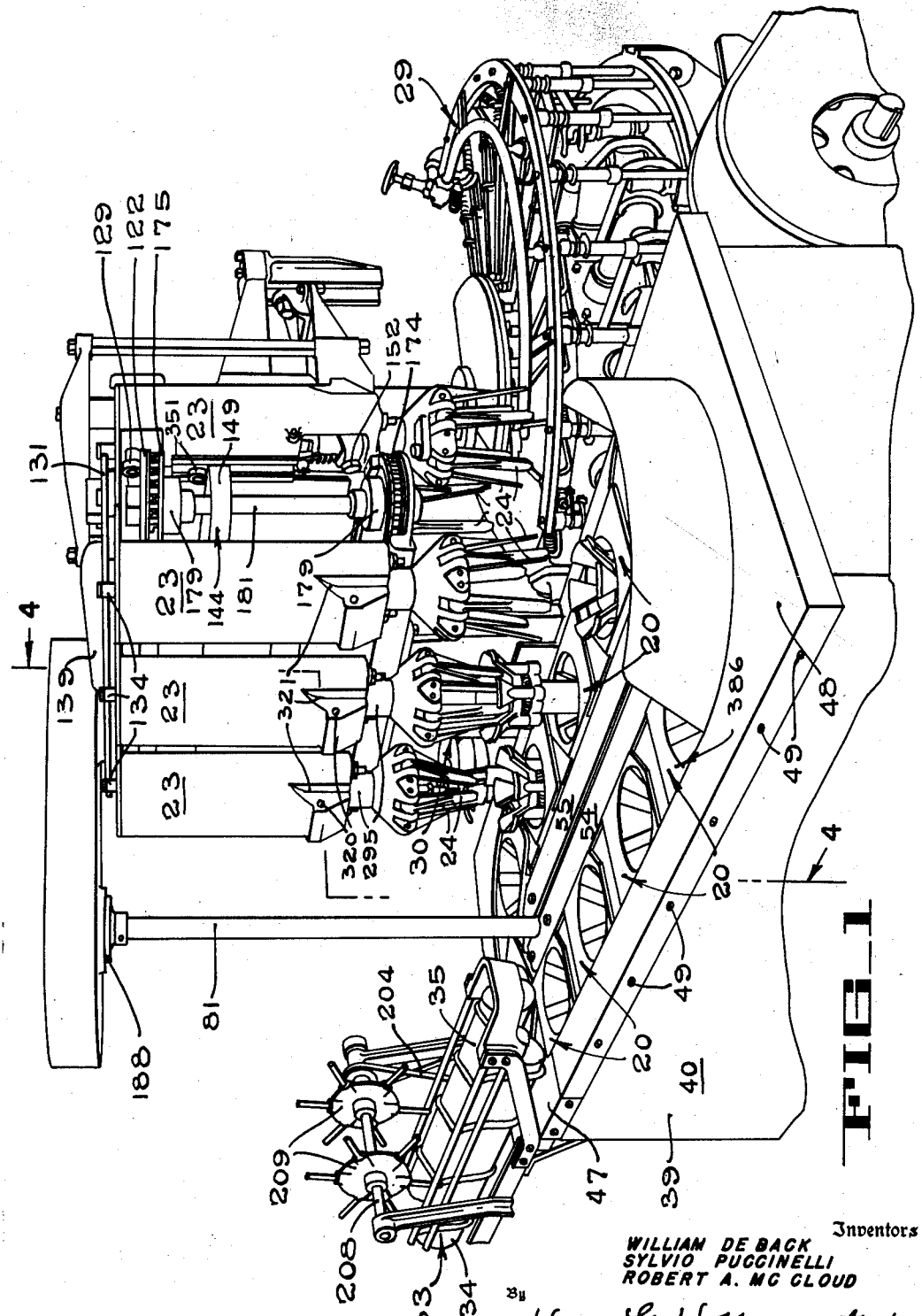

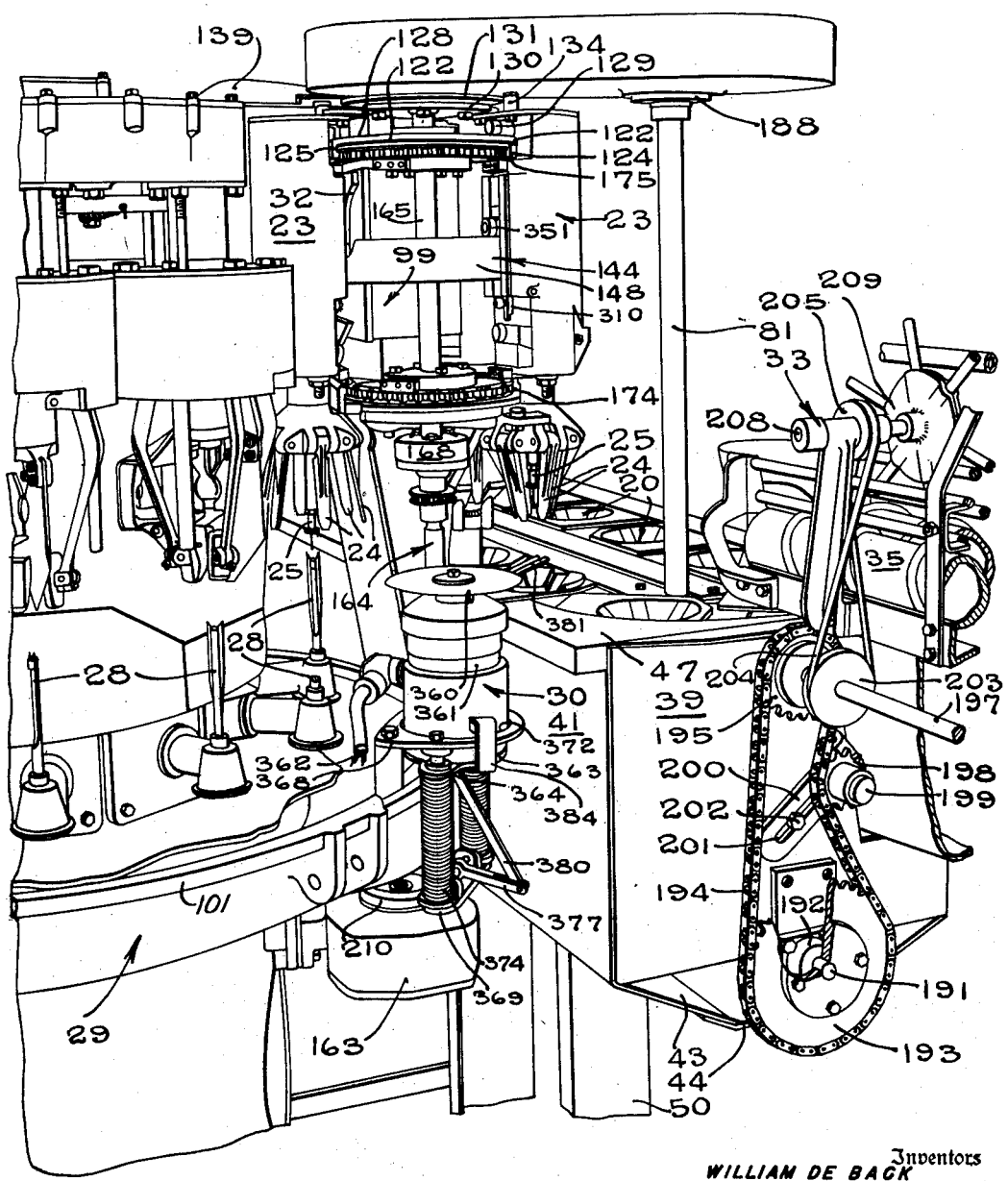

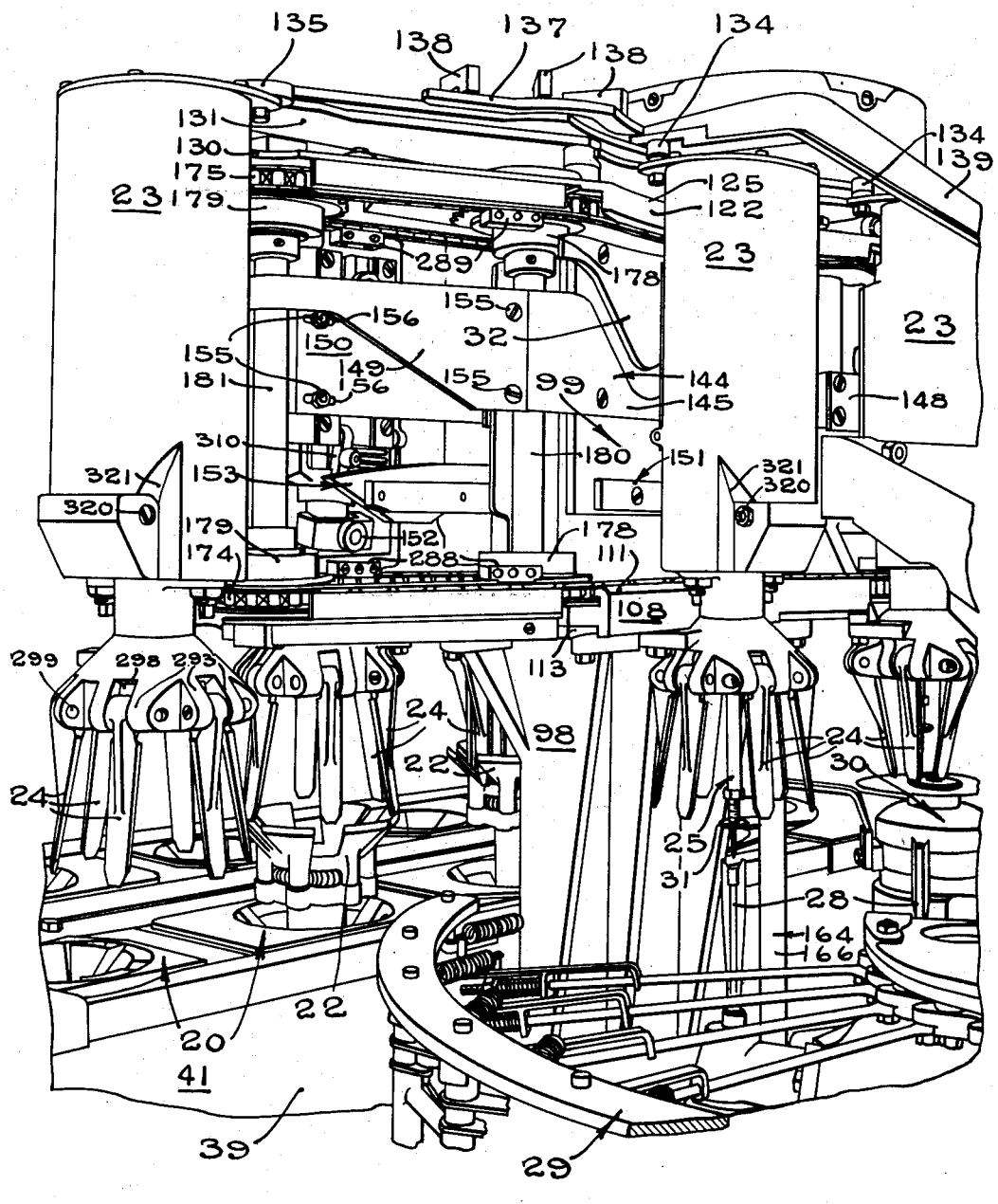
FIG_3

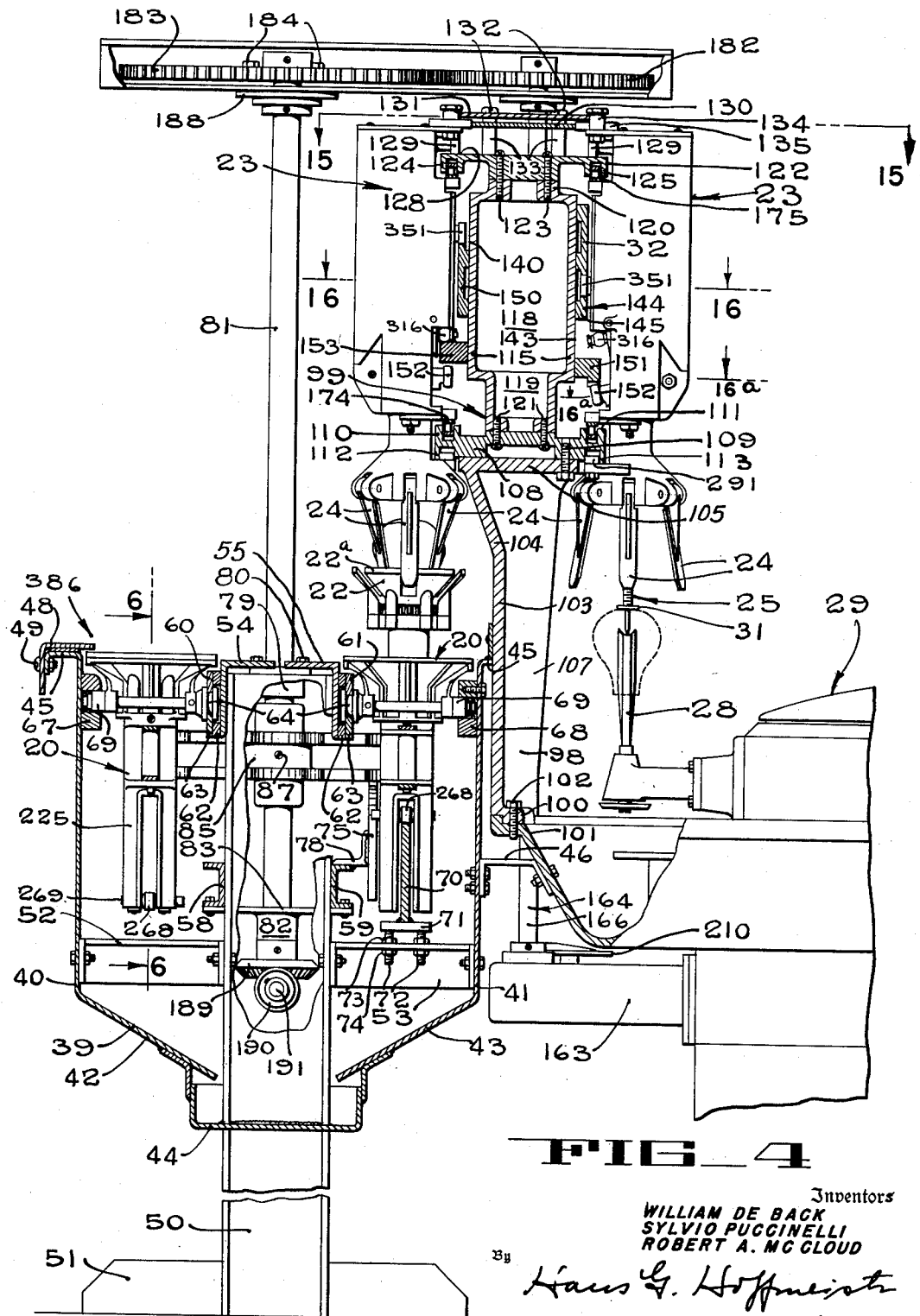
FIG_4
Inventors
WILLIAM DE BACK
SYLVIO PUCCINELLI
ROBERT A. MCCLOUD
Attorney

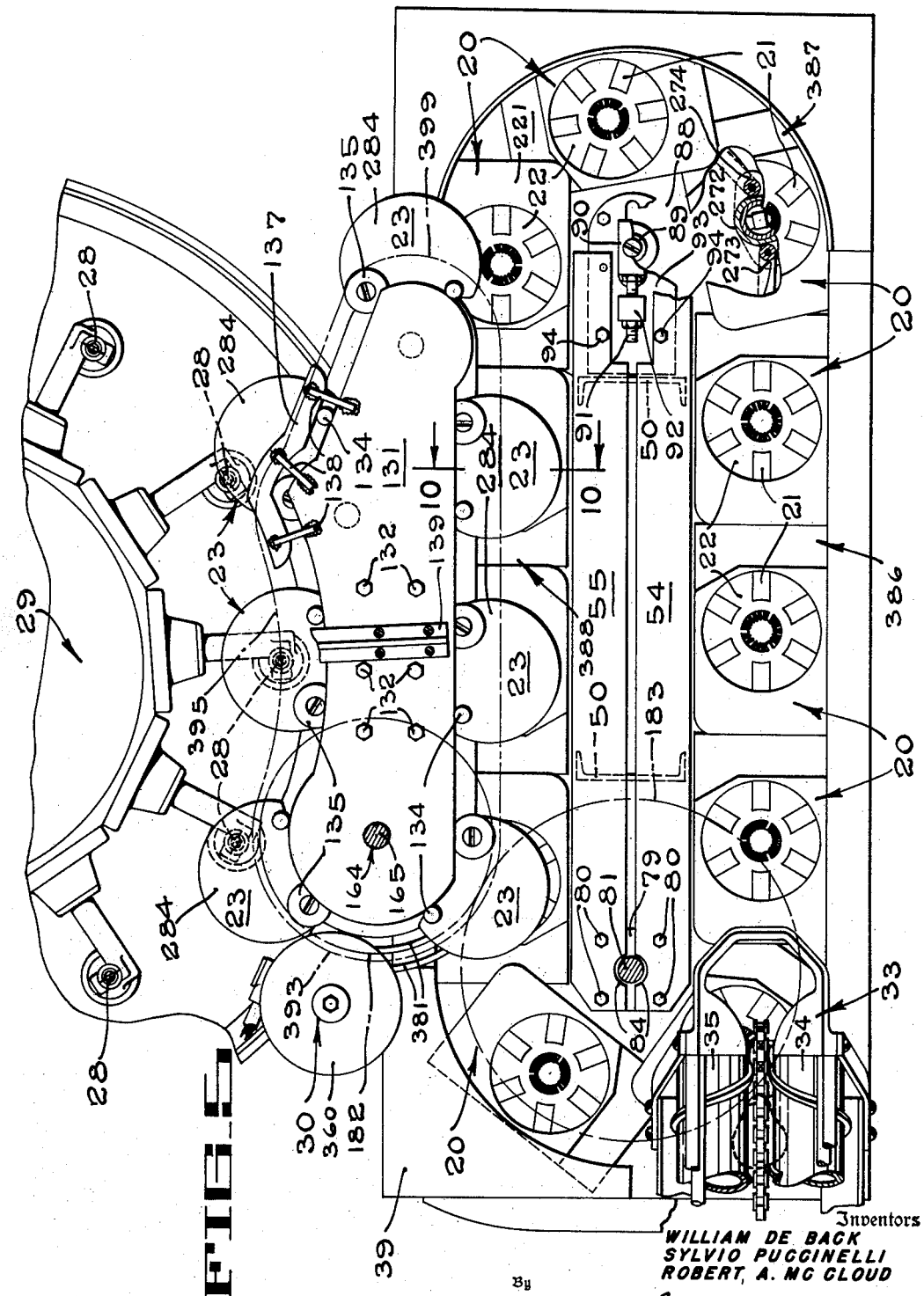

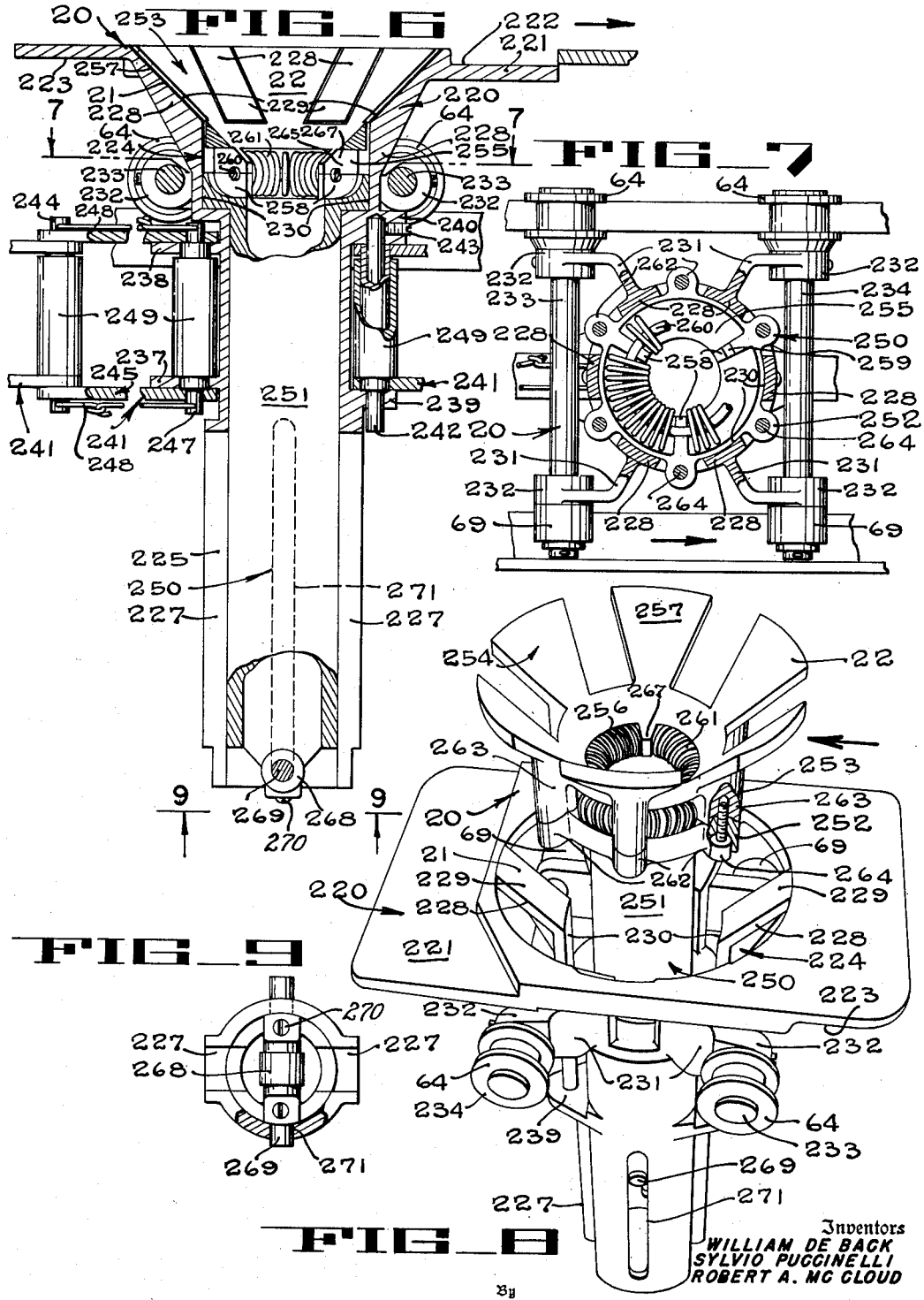

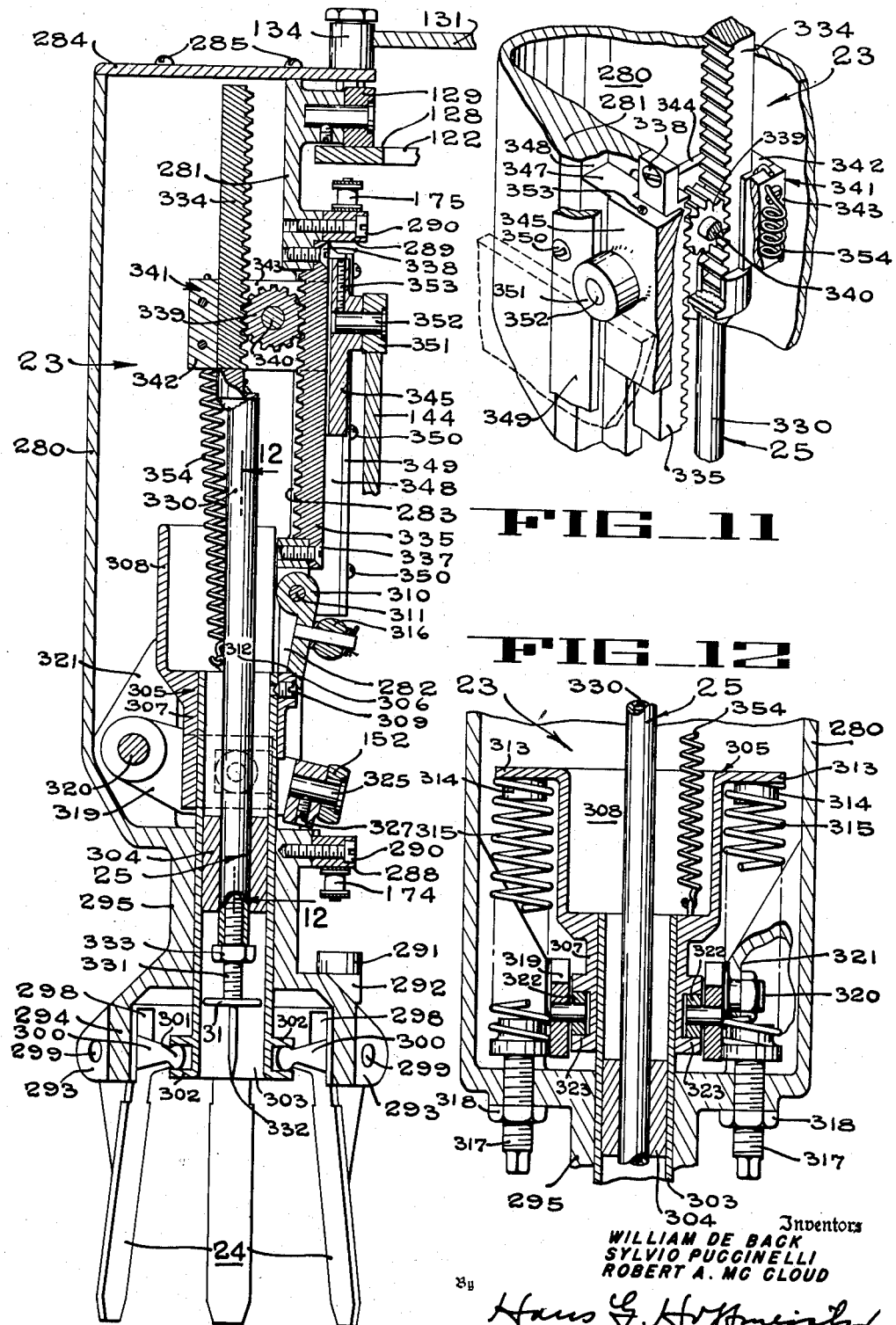

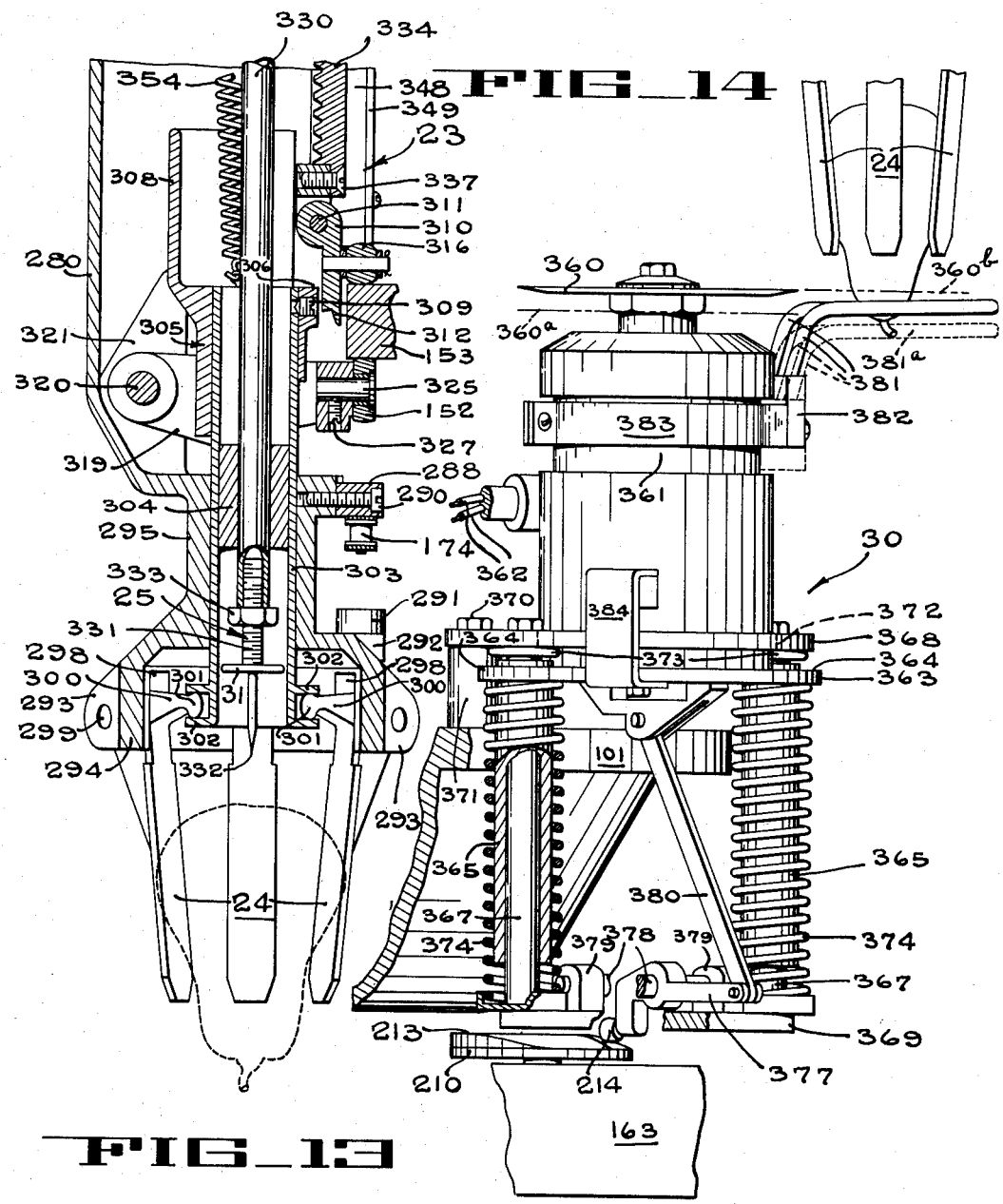

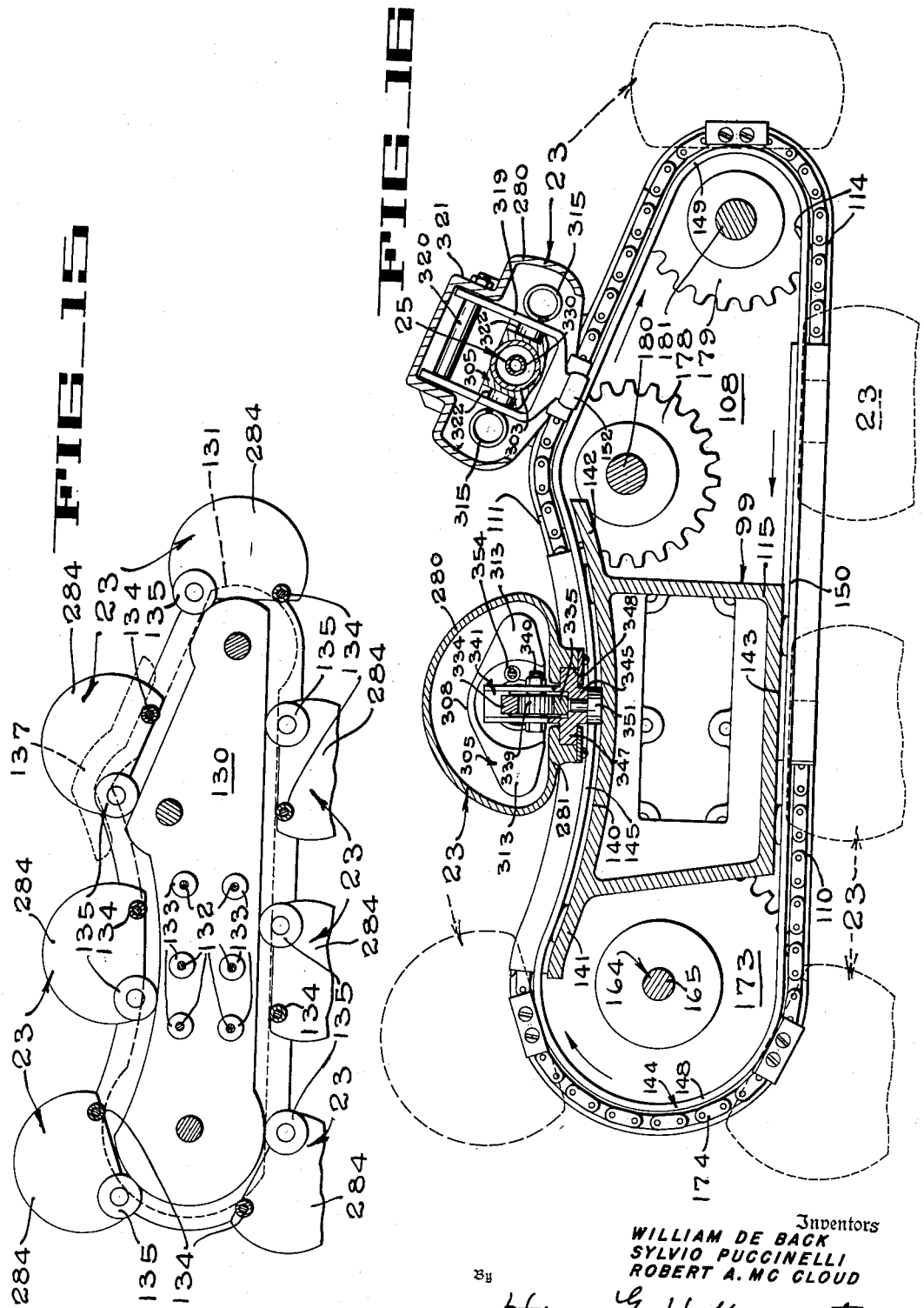

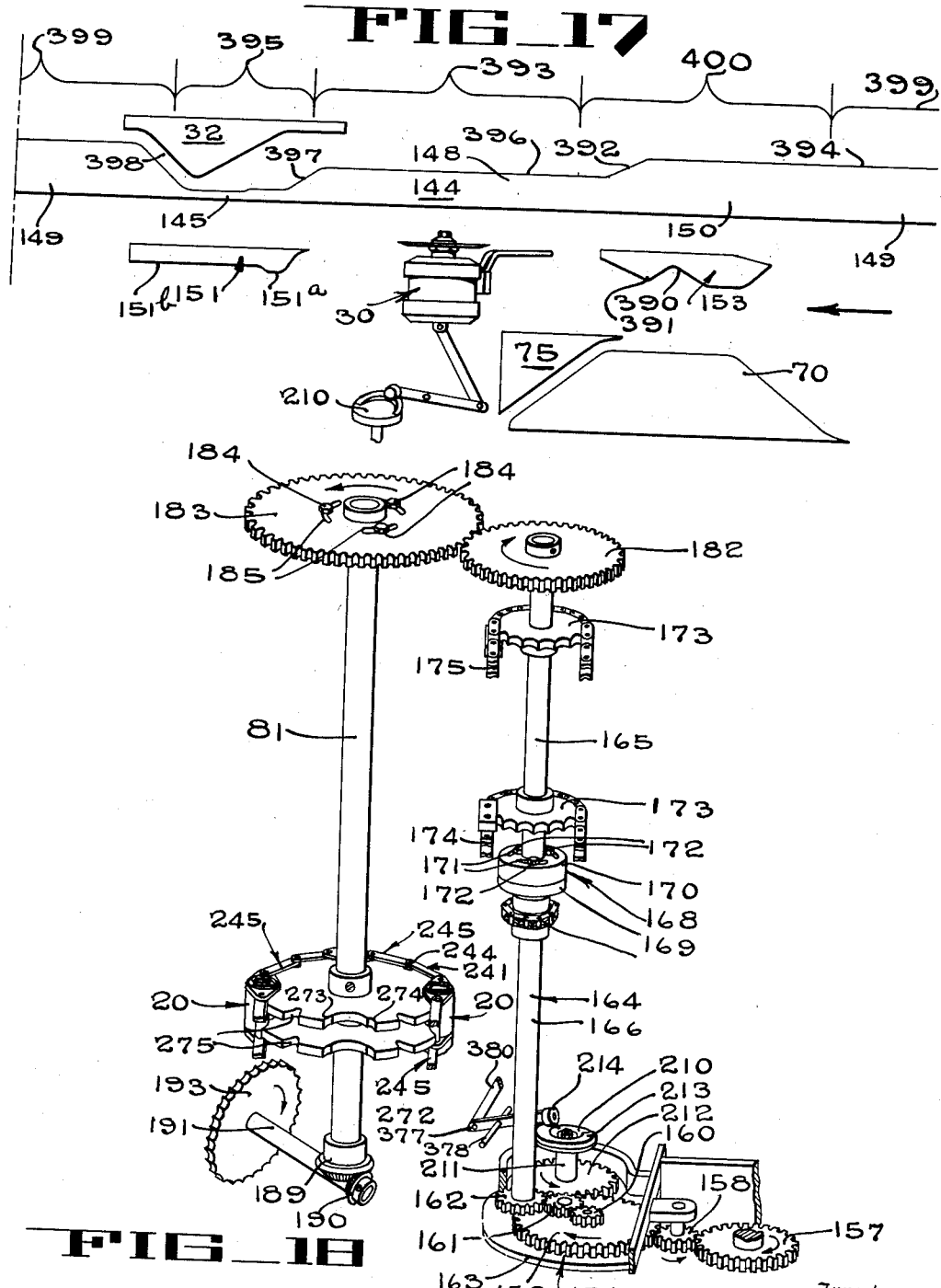

---

2,738,819

APPARATUS FOR AND METHOD OF FEEDING PEARS

William De Back and Sylvio Puccinelli, San Jose, and Robert A. McCloud, San Lorenzo, Calif., assignors to Food Machinery and Chemical Corporation, San Jose, Calif., a corporation of Delaware Application September 25, 1950, Serial No. 186,562

40 Claims. (Cl. 146—224)

This invention relates to a fruit handling machine and more particularly to a mechanism for feeding and presenting pears for impalement, along their stem-blossom axes, upon the stemming tubes of a pear preparation machine.

An object of the present invention is to provide an improved feed mechanism for presenting a pear to the stemming tube of a pear preparation machine with the stem-blossom axis of the pear aligned with the axis of the stemming tube.

Another object is to center the stem end of a pear dropped stem end first into a lift member, and then to present the pear to a transfer device which aligns the stem-blossom axis of the pear for impalement on a stemming tube.

Another object is to mount a plurality of pear feeding cups for progressive movement around a closed path, a portion of said path being in congruity with a portion of the path of a pear aligning and transferring device which receives the pear from a feed cup and brings the stem-blossom axis of the pear into alignment with the axis of a stemming tube of a pear preparation machine for impalement thereon.

Another object is to provide an improved pear feed and transfer mechanism for positioning a pear with its stem-blossom axis vertical, and thereafter advancing the pear in such vertical position to successive operative portions of the mechanism.

Another object is to provide the feed cup of a pear feed mechanism with means to facilitate centering the stem end of a pear therein.

Another object is to provide a pear feed mechanism with a plurality of traveling tapered cups, segmental portions of which are adapted to be elevated to present a pear in the cup to a transfer mechanism.

Another object is to provide an improved mechanism for presenting a pear for impalement along its stem-blossom axis to a vertical stemming tube while the stemming tube is moving in conformity with a predetermined operating cycle.

Another object is to provide improved means for bringing the stem-blossom axis of a pear to a predetermined position of alignment.

Another object is successively to grasp, release, and regrasp a pear supported in a receptacle so as to dispose the stem-blossom axis of the pear in a predetermined position of alignment.

Another object is to provide improved facilities for rapidly feeding pears to a pear preparation machine and for bringing the stem-blossom axes of succeeding pears into registering relation with successive stemming tubes of the pear preparation machine.

These and other objects and advantages of the present invention will be apparent from the following description and the accompanying drawings wherein:

Fig. 1 is a fragmentary perspective view showing the upper operative portion of a pear feed and transfer mechanism embodying the present invention as it would appear mounted adjacent a pear preparation machine, the discharge end portion of an automatic pear positioning device also being shown.

Fig. 2 is a perspective view showing the opposite end of the mechanism from that shown in Fig. 1.

Fig. 3 is an enlarged fragmentary perspective view looking toward the right hand rear corner of the mechanism as shown in Fig. 1, one of the bottle shaped transfer devices being removed.

Fig. 4 is a vertical transverse section taken substantially along line 4—4 of Fig. 1, portions being broken away.

Fig. 5 is a plan view of the mechanism illustrated in Figs. 1 to 4 inclusive, a top gear housing and a pair of meshed drive gears therein being broken away, the pitch lines of said drive gears being indicated in dot-dash lines.

Fig. 6 is an enlarged fragmentary section taken along line 6—6 of Fig. 4.

Fig. 7 is a similarly enlarged section taken along line 7—7 of Fig. 6.

Fig. 8 is a perspective view of the feed cup carriage assembly shown in Figs. 6 and 7 as it would appear with the central pear lift member thereof elevated to present a pear to the gripping fingers of the transfer device.

Fig. 9 is a bottom view of the lower end portion only of the feed cup assembly looking in the direction of the arrows 9—9 in Fig. 6.

Fig. 10 is an enlarged fragmentary vertical section taken along line 10—10 of Fig. 5, a set of pear gripping fingers being shown latched in their open or pear receiving condition.

Fig. 11 is a fragmentary perspective view of portions of the operating mechanism of a pear anchoring spike and pushout plunger shown in Fig. 10.

Fig. 12 is a fragmentary section taken along line 12—12 of Fig. 10.

Fig. 13 is a fragmentary section similar to the lower portion of Fig. 10, but showing the pear gripping fingers in their closed, pear gripping condition, the outline of a pear gripped thereby being indicated in broken lines.

Fig. 14 is an enlarged fragmentary view showing a side elevation of the stem-end trimming mechanism, portions thereof being broken away.

Fig. 15 is a somewhat diagrammatic fragmentary section taken along line 15—15 of Fig. 4 showing one of a pair of plate cams which control the positioning of the transfer devices, the outline of a second vertically spaced plate cam being indicated in broken lines.

Fig. 16 is a fragmentary section taken along line 16—16 of Fig. 4, one of the bottle-shaped transfer devices being shown sectionally along the line 16—16, and another thereof being shown sectionally along the line 16a—16a of the same Fig. 4, the outlines of the other transfer devices being indicated in broken lines.

Fig. 17 is a diagrammatic layout of the various cams employed in the mechanism as they would appear developed along a plane surface.

Fig. 18 is a diagrammatic perspective view of principal operative portions of the drive mechanism.

*General description and operation*

The illustrated form of the invention comprises a plurality of feed cup carriage 20 (Figs. 1, 2, 5 and 6) linked together in the nature of an endless conveyor chain and arranged to travel in recurring cycles along a closed path (Fig. 5) having straight sides and rounded ends.

A conically tapered feed cup recess 21 is provided centrally of the top of each carriage, and is adapted to receive a pear stem end down therein. A pear lift member 22 is formed with a plurality of spaced wall segments which normally fit flush in apertures provided therefor in the feed carriage 20. The lift member 22 is adapted to be elevated (Figs. 1, 5 and 8) as it moves congruently with a transfer device 23.

A plurality of the pear gripping transfer devices 23 are arranged to travel in recurring cycles along an irregular closed path (Fig. 5) a portion of which is opposite a portion of the path of the carriages 20. A plurality of downwardly extending, spring biased gripping fingers 24 are provided on each transfer device 23, and these fingers are adapted to swing toward and away from an upright axis of convergence. During their movement along the opposed portions of their respective paths each transfer device moves congruently with a feed carriage, and with the axis of convergence of its gripping fingers 24 co-incident with the vertical axis of the cup recess in the carriage 20.

Elevation of the lift member 22 (Figs. 1, 5 and 8) as its carriage moves congruently with a transfer device 23 brings the wall segments of the lift member into interdigitated relation with the gripping fingers 24 of the transfer device 23 (Figs. 1, 10 and 13). Closure of the gripping fingers when thus interdigitated causes them to pass through the spaces between adjacent wall segments of the lift member to grip the bulb end of a pear elevated by the lift member.

In gripping the pear to remove it from its feed cup, (Figs. 2 and 13) the fingers 24 first close about the pear to straighten it in its feed cup, after which they release the pear momentarily to allow its stem end to gravitate to centered position in the feed cup, and then grip the pear again, thereby assisting in positioning the pair with its stem-blossom axis co-incident with the axis of convergence of the gripping fingers 24. When thus gripped for the second time by the gripping fingers, a spike 25 (Figs. 3, 10 and 13) is driven into the butt end of the pear along its stem-blossom axis to assist in retaining the pear against axial displacement.

As the transfer devices 23 travel along their irregular closed path, with a pear gripped in the fingers of each device, they subsequently pass directly above a portion of the path of the upright stemming tubes 28 (Fig. 3) of a pear preparation machine 29 (Fig. 1, 2, 3, and 4) which the present mechanism is designed to serve, the transfer devices being timed to move congruently with successive stemming tubes 28 during this portion of their travel. As they approach their position of congruent relation with the stemming tubes, the pears are carried past a stem end trimming mechanism 30 (Fig. 3) which severs a predetermined portion from the stem end of each pear.

The particular type of pear preparation machine employed is not material to the present invention, providing the transfer devices are arranged to move congruently with successive stemming tubes during the portion of their travel in which the pears are being impaled on the stemming tubes. The pear preparation machine 29 illustrated is of the type described in U. S. patent application of De Back et al. filed September 6, 1949, Serial No. 114,168, now Patent No. 2,699,191, issued January 11, 1955.

While the transfer devices 23 are traveling congruently with the stemming tubes 28, the pears are released by their gripping fingers and are thereupon pushed downward lengthwise of their stem-blossom axis, by a pusher disk 31 (Figs. 3, 10 and 13) provided on the spike 25, to an initially impaled condition on the stemming tubes, and are thereafter pushed to fully impaled condition on the stemming tubes of the pear preparation machine by the action of a spike depressing cam 32 (Figs. 2, 3, and 17).

Although the pears may be fed by hand in stem end down position into the feed cup recesses 21 it is preferable to employ a pear positioning apparatus 33 (Figs. 1 and 2) for this purpose. The positioner 33 is of the type described in U. S. patent application of Albert R. Thompson filed July 19, 1947, Serial No. 762,190, now Patent No. 2,596,798, issued May 13, 1952. By this mechanism the pears are dropped stem end first in predetermined timed sequences from the discharge end of the positioning apparatus 33 so as to feed one pear into each feed cup as it passes therebeneath.

*Frame structure and drive mechanism*

The feed carriages 20 are supported for travel along their closed path in a tank-like frame structure 39 (Figs. 1, 2 and 4) having vertical side walls 40 and 41 and sloping bottom portions 42 and 43 which are adapted to drain into a central trough 44 for which a conventional drain outlet, not shown, may be provided. The tank 39 is adapted to be mounted alongside the pear preparation machine 29 which it is designed to serve, and to be connected to a suitably rigid portion thereof by a brace bracket 46 (Fig. 4). Outwardly bent flanges 45 (Fig. 4) are provided around the upper rim of the tank 39, and cover shields 47 and 48 are secured by bolts 49 to these flanges to provide a cover plate surrounding the closed path of the feed carriages 20.

A pair of channel section support legs 50 (Fig. 4), with transverse base portions 51 secured thereto, extend upwardly through correspondingly shaped openings in the trough 44 and are secured in liquid-tight relation to the trough by welding.

Laterally extending braces 52 and 53 of angle section (Fig. 4) are bolted in place between the sides of each leg 50 and the vertical tank side walls 40 and 41 opposite thereto. A pair of longitudinally extending top frame members 54 and 55 of angle section (Figs. 1, 4, and 5) are secured lengthwise of the upper ends of both legs 50, and terminate short of the ends of the tank to form, in effect, a central island rigidly supported by the legs 50.

A pair of longitudinally extending lower frame members 58 and 59 of channel section are secured to opposite sides of the legs 50, being spaced downwardly some distance from the top angle members 54 and 55. These lower channel members 58 and 59 extend lengthwise of the tank 39 the same distance as the top angle members 54 and 55.

A pair of flanged carriage support tracks 60 and 61 (Fig. 4) are provided along the outer side of each of the longitudinally disposed top angle member 54 and 55. Each of these tracks comprises a pair of parallel, spaced, base bar portions 62, of substantially rectangular cross sectional shape, having flange strips 63 mounted thereon. The flange strips 63 extend laterally into the space between the base bar portions 62 to provide track flanges for supporting and guiding a pair of grooved support rollers 64 (Figs. 4, 6, and 7) mounted on a side of each feed cup carriage 20 to be described in detail later herein. A pair of parallel rectangular track bars 67 and 68 also is secured along each side wall of the tank 39 laterally opposite each pair of the flanged tracks 60 and 61 to receive between them cylindrical support rollers 69 (Figs. 4 and 7) mounted on the other side of each feed cup carriage 20 from the grooved rollers 64.

A lift cam 70 (Figs. 4 and 17) is welded to a pair of short, transverse base bars 71 supported on a pair of threaded studs 72 secured by nuts 73 and 74 in adjusted position on the transverse brace members 53 centrally beneath the straight portion of the path of the feed carriages which underlies the corresponding portion of the path of the transfer devices 23. A lift return cam 75 (Figs. 4 and 17) is mounted on a bracket 78 secured to the longitudinal channel member 59 to engage a portion of the pear lift member, and thereby to insure its return to a normal, lowered position after each elevation thereof by the lift cam 70. The lift return cam 75 (Fig. 4) is mounted in laterally offset relation to the lift cam 70, since the portion of the pear lift member 22 engaged by the lift cam 70 is located centrally of the lower portion of the feed carriage 20, while the portion engaged by the lift return cam projects laterally beyond a side of the carriage in a manner to be described later herein.

A flanged shaft bearing 79 (Fig. 4) is secured by screws 80 in axially upright position to the under side of the horizontal upper flanges of the longitudinally disposed top angle members 54 and 55 (Figs. 4 and 5) adjacent one end thereof. A vertical drive shaft 81 is journaled in this bearing 79 and also in a vertically aligned lower bearing 82 (Fig. 4) secured to a bearing support plate 83 bolted transversely beneath the longitudinal lower channel members 58 and 59. Notches 84 (Fig. 5) are cut in the top flanges of the angle members 54 and 55 to provide clearance for the upwardly extending portion of the shaft 81. A double sprocket wheel 85 (Figs. 4 and 18), for driving the feed cup carriages along their closed path, is mounted on the vertical shaft 81, being secured thereto by set screws 87. A similar double sprocket wheel 88 (Fig. 5) is mounted on a vertical idler shaft 89 journaled in upper and lower floating bearing blocks 90 in a conventional manner. The upper bearing block 90 (Fig. 5) is secured in adjusted position by an adjusting screw 91 having threaded engagement with an abutment 92 secured to a plate 93, which, in turn, is secured by screws 94 to the longitudinally disposed angle members 54 and 55. The generally similar lower bearing block, not shown, may be mounted on a plate, also not shown, secured transversely across the lower channel members 58 and 59 in the same manner that the plate 93 is secured across the angle members 54 and 55. By means of the adjusting screws 91 the idler shaft 89 with its double sprocket wheel 88 mounted thereon can be moved transversely of the shaft axis to adjust the tautness of the endless chain-like assembly of the feed cups to be described later herein.

A transfer frame support standard 98 (Figs. 1, 2, 3, and 4) has a base flange 100 adapted to fit into the flanged rim 101 of the troughed frame portion of the pear preparation machine 29, and is secured thereto by bolts 102 (Fig. 4). The standard 98 is adapted to support a transfer frame 99, and is of cast metal with an upright lower wall portion 103, a sloping upper wall portion 104, a transverse top portion 105 and vertical reinforcing ribs 107.

The transfer frame 99 (Figs. 1, 2, 3, 4, and 16) for supporting and guiding the transfer devices 23 in their travel around their irregular closed path, comprises a base plate 108, a hollow, cam supporting central body portion 115, and a top plate 122. The base plate 108 is secured (Fig. 4) by screws 109 on top of the transverse top portion 105 of the standard 98. Grooved chain guide channels 110 and 111 are provided along opposite sides of the upper face of the base plate 108, and generally similar roller guide channels 112 and 113 (Figs. 3, 4, and 16) are provided in the underside of the plate 108 beneath the chain guide channels 110 and 111. These chain and roller guide channels extend only along the sides of the base plate 108 where the axes of convergence of the gripping fingers on the transfer devices are required to be in congruent relation, first, with the feed lift members 22 to receive the fruit therefrom, and subsequently, with the stemming tubes 28 of the pear preparation machine 29, as will be explained later herein. The side walls of all of the chain and roller track guide channels are flared outwardly at their entrance ends in the manner shown at 114 (Fig. 16) to guide the elements moving along these track channels smoothly into the entrance ends thereof.

The central cam support member 115 of the transfer frame (Figs. 3, 4, and 16) is of hollow cast metal, and is secured by screws 121 on the base plate 108. The central cam support member 115 has a relatively large, central, cam supporting portion 118, a reduced lower end portion 119, and a reduced upper end portion 120.

The transfer frame top plate 122 (Figs. 1, 2, 3, 4, and 5), similar in outline to the base plate 108, is secured by screws 123 (Fig. 4) on top of the reduced upper end portion 120 of the cam support member 115. Downwardly facing chain guide channels 124 and 125 (Figs. 3 and 4) are formed marginally along the two sides of the transfer frame top plate 122 similarly to the upwardly facing chain guide channels 110 and 111 in the base plate 108, and are superposed directly thereover. A flat track 128 also is machined on the upper surface of the transfer frame top plate 122 entirely around the marginal edge portion thereof to support a plurality of transfer device support rollers 129 (Fig. 4), one of which is mounted on each of the transfer devices 23 in a manner to be described later herein.

A pair of horizontal transfer device guide cam plates 130 and 131 (Figs. 1, 2, 3, 4, and 15) are mounted in vertically spaced relation, on screw posts 132 (Figs. 4 and 15) and spacers 133 above the top plate 122 of the transfer support frame 99, the lower guide cam plate 130 being spaced upwardly from the transfer frame top plate 122. The marginal edges of these cam plates 130 and 131 serve as guides for rollers 134 and 135 (Figs. 4, 5, and 15) mounted on opposite ends of each transfer device to guide it in recurring cycles along its irregular closed path in a manner to be described later herein. A short supplemental cam plate 137 (Figs. 3 and 5) is mounted, by bars 138 in laterally spaced relation to the upper cam plate 131 to guide the leading smaller rollers 134 as they travel along this sharply diverging edge portion of the upper cam plate. A bracing bracket 139 (Figs. 2, 3, and 5) is connected from the upper cam plate 131 to any suitably rigid portion of the pear preparation machine.

Returning now to a further description of the hollow cam support member 115 of the transfer support frame 99, the side face 140 of the larger intermediate portion 118 of the cam support member 115 toward the pear preparation machine 29 is concavely curved to define a cylindrical surface, and the transfer frame is mounted with the axis of curvature of this concave cylindrically curved surface concentric with the axis of rotative travel of the stemming tubes 28 of the pear preparation machine 29. Flanges 141 and 142 (Fig. 16), cast integrally with the cam support member 115, extend endwise beyond the hollow central portion of the member 115, and are curved to conform to the concave cylindrical curvature of the face 140. These extension flanges 141 and 142 serve to lengthen the cam supporting face 140. The opposite face 143 of the larger intermediate portion 118 of the cam support member 115 is flat and vertical to conform to corresponding straight superposed portions of the paths of the feed carriages and of the transfer devices adjacent thereto.

A spike elevating cam 144 (Figs. 1, 2, 3, 4, 10 and 17) extends continuously around the entire path of the transfer devices 23 (Figs. 3, 4 and 10). One portion of the spike elevating cam 144 comprises a cam plate 145 (Fig. 4) secured lengthwise of the arcuately curved face 140 of the cam support member 115, being curved to conform thereto. Curved, spike elevating cam end plates 148 and 149 (Figs. 1, 2, 3, 5 and 17) are mounted to form continuations of the spike elevating cam 144 around the ends of the cam support member 115, and a cam plate 150, mounted on the flat side 143 of the transfer frame support member 115 to conform thereto, extends between the other ends of the curved end cam plates 148 and 149 from the cam plate 145 to complete the continuously extending spike elevating cam 144.

The end cam plates 148 and 149 are adjustably secured to the side cam plates 144 and 150 by bolts 155 (Fig. 3) inserted in holes in the end cam plates and in slotted holes 156 in the side cam plates. This allows adjustment of the end cam plates to bring them into conformity with the path of a spike actuating roller to be described later herein. The spike depressing cam 32 (Figs. 3, 4, and 17), mentioned previously herein, is mounted on the concave cylindrically curved face 140 of the cam support 115, being curved to conform thereto, and extends (Fig. 17) into a depression in the upper side of the spike elevating cam 144.

A gripping finger opening and latching cam 151 (Figs. 3, 4, and 17) is mounted on the concave cylindrically curved face 140 of the cam support member 115 to conform thereto, and extends beneath the spike depressing cam 32. This finger opening and latching cam 151, as shown in Fig. 4, extends outwardly from the surface on which it is mounted farther than the spike elevating cam 144 or the spike depresing cam 32, since the path of a finger actuating roller 152 (Fig. 4) which the cam 151 engages is at such greater distance from the curved cam supporting face 140 of the cam support member 115.

A combined latch release and gripping finger actuating cam 153 (Figs. 3, 13 and 17) is mounted on the flat outer face 143 of the cam support member 115, and conforms to the flat surface thereof. The cam 153 extends outwardly from its mounting surface the same distance as the finger opening and latching cam 151 described previously herein, since its lower surface is adapted to engage the same finger actuating roller 152 as the cam 151.

In order to drive the feed cup carriages 20 and the transfer devices 23 around their respective paths in timed relation to the pear positiong apparatus 33, to each other, to the stem end trim mechanism 30, and to the stemming tubes 28 of the pear preparation machine 29 which they serve, positive, timed, driving connection is provided between these various mechanisms. In the illustrated form of the invention this timed driving connection consists in part of a gear train 154, with the gears 157, 158, 159, 160, 161 and 162 thereof (Fig. 18) mounted in a gear case 163 (Figs. 2 and 4) on a side of the base frame of the pear processing machine over an access opening therein.

The gear train 154 provides timed driving connection between the gear 157 (Fig. 18) of the pear preparation machine 29, and a vertical shaft 164 (Figs. 1, 2, 4, 5, and 18), having the gear 162 secured thereto. The vertical shaft 164 comprises upper and lower shaft portions 165 and 166, connected co-axially to each other by an adjustable connector 168 (Figs. 2 and 18). The connector 168 comprises a pair of superposed concentric flanges 169 and 170 secured, respectively, to the shaft portions 165 and 166. One of the flanges 170 has a plurality of arcuate slots 171 (Fig. 18) therein through which are passed the shanks of a plurality of screws 172 which are screwed into threaded holes in the other flange 169. Upon loosening the screws 172 the upper and lower flanges and their connected shaft portions can be rotatively adjusted, and can be secured in such adjusted position by again tightening the screws.

A pair of axially spaced, chain drive sprocket wheels 173 are secured to the upper shaft portion 166, and a pair of transfer device drive chains 174 and 175 are trained around these sprocket wheels and also around two pairs of similarly axially spaced pairs of idler sprocket wheels 178 and 179 (Figs. 3, and 16) mounted on idler shafts 180 and 181, respectively, extending between the base and top plates 108 and 122 of the transfer frame 98 on the opposite end of the hollow central portion of the cam support member 115 from the drive sprockets 173. The lower chain 174 (Figs. 3, 4 and 16) runs in the upwardly opening grooved channels 110 and 111 provided therefor marginally along the sides of the transfer frame base plate 108, and the upper chain 175 runs in the downwardly opening grooved channels 124 and 125 provided therefor marginally along the sides of the transfer frame top plate 122.

A gear 182 (Figs. 4, 5 and 18) is secured on the upper end of the upper shaft portion 166 and is in mesh with a second gear 183 secured for rotative adjustment on the upper end of the vertical shaft 81 described previously herein, by screws 184. The screws 184 pass through arcuate slots 185 in the gear 183 and are screwed into threaded holes provided therefor in a flange 188 (Figs. 1, 2 and 4) in a manner generally similar to that described for connecting the flanges 169 and 170.

A bevel gear 189 (Figs. 4 and 18) is secured on the lower end of the vertical shaft 81 and has meshed driving engagement with a bevel pinion 190 mounted on the inner end of a horizontal shaft 191 journaled in a bearing 192 (Fig. 2) to project through an end wall of the tank 39. A sprocket 193 is secured to the projecting outer end of the shaft 191, and a drive chain 194 passes around this sprocket 193 and also around a sprocket 195 secured to a shaft 197 which drives the pear positioning apparatus 33. A conventional slack take-up idler sprocket 198 is journaled on a stub shaft 199 secured to a bracket 200 having a slotted opening 201 therein. The bracket 200 is secured in adjusted position by a bolt 202 inserted through the slot 201 and screwed into a threaded hole provided therefor in the end wall of the tank 39.

A grooved pulley 203 also is mounted on the shaft 197 and drives a V-belt 204 which passes around a grooved pulley 205 mounted on a shaft 208 which extends transversely above the positioning rolls 34 and 35. A pair of rubber fingered rotors 209 (Figs. 1 and 2) are secured to the transverse shaft 208 to rotate therewith, and assist in positioning the pears in stem end first position between the rolls 34 and 35 as described in the Thompson patent application Serial No. 762,190 referred to previously herein.

Drive means for vertically reciprocating the stem end trimming mechanism 30 comprises a face cam 210 (Figs. 2, 14 and 18) mounted on the upper end of a short vertical shaft 211. The shaft 211 has a gear 212 secured on its lower end and in mesh with the gear 159 in the gear train 154. The face cam 210 has a cam track 213 on a side thereof which engages a cam follower roller 214 to actuate the stem-end-trim mechanism in a manner to be described later herein.

*Pear feed and lift mechanism*

The feed cup carriages 20 travel in recurring cycles along a closed horizontal path (Fig. 5) with straight sides and rounded ends as mentioned previously herein. Each carriage 20 has a body 220 (Figs. 1, 2, 3, 4, 5, 6, 7, and 8) with a flat horizontal plate portion 221. The upper surface 222 (Fig. 6) on one end of the plate portion 221, and the lower surface 223 on the other end thereof, are relieved to allow the plate portions of adjacent carriages to overlap when traveling around the rounded end zones of their path as shown in Fig. 5. Each carriage plate portion 221 has a recessed cup portion 224 formed centrally thereof which opens centrally into an integrally formed upright tubular lower portion 225. The lower end of the tubular portion 225 has upwardly extending elongated notches 227 (Figs. 4, 6, and 9) in the front and rear sides thereof to allow the lift cam 70 (Figs. 4 and 17) to pass freely therethrough as the carriage travels around its closed path.

The conformation of the cup portion 224 is best shown in Figs. 6, 7 and 8. The walls of the cup portion, except for a plurality of segmental strips 228, are removed, the side edges of each segmental strip defining upright parallel planes. The upper faces 229 of the segmental cup strips 228 are curved to define a common conical surface, the axis of which is co-incident with that of the tubular lower portion 225 of the carriage 20, while the lower portions 230 of the strips 228 are curved to define a cylindrical recess, also co-axial with the lower tubular portion 225.

Four outwardly extending bracket arms 231 (Figs. 6, 7 and 8) are formed integrally with side strips 228 of the cup portion of the carriage body 220, the arms 231 having drilled, axle receiving bosses 232 on their outer ends to receive a pair of axles 233 and 234 therein. Each axle has one of the grooved carriage support rollers 64 rotatably mounted on one end thereof to ride between the pairs of flanged tracks 60 and 61 along the central angle members 54 and 55, and also has one of the plain cylindrical rollers 69 mounted on its other end to ride between the pairs of tracks 67 and 68 along the sides of the tank 39.

Each downwardly extending tubular carriage portion 225 has a pair of vertically aligned link-mounting ears 237 and 238 extending from its rearward side near its upper end, and also has an oppositely extending pair of link-mounting ears 239 and 240 extending from its forward side. A conventional roller-chain type link 241 (Figs. 6 and 18) is pivotally mounted on a pin 242 secured by a set screw 243 in vertically aligned holes in the forwardly extending ears 239 and 240, and this link 241 is linked by a central pin 244 to a second conventional roller chain link 245. The forward end of this second link is connected by a pivot pin 247 to the rearwardly extending ears 237 and 238, on the rearward side of the carriage 20 next forwardly thereof. Safety wires 248 are inserted through holes in the upper and lower ends of the link pins 244 and 247 to secure them against displacement. Usual link rollers 249 are provided around each pin connection of the links and are adapted to rotate freely thereon.

Each pear lift member 22 (Figs. 5, 6, 7, and 8) consists of a generally tubular lower lift element 250, and an axially aligned, superposed annular upper lift element 253. The lower lift element 250 has a tubular lower portion 251 adapted to fit slidably into the tubular lower portion 225 of the carriage body, and an enlarged, annular head portion 252 of cylindrical exterior shape adapted to fit freely (Fig. 6) into the cylindrical recess defined by the lower portions 230 of the segmental strips 228 in the carriage cup portion 224. An annular roller receiving recess 255 (Figs. 6 and 7) is formed in the upper end of the head portion 252 of the lower lift element 250, and three abutments 258 extend inwardly transversely across this recess. Semi-circular notches 259 (Fig. 7) are provided in these abutments to receive and support a wire ring 260 upon which are threaded a plurality of freely rotatable roller disks 261 to form an annulus of such disks.

A plurality of radially extending, rounded abutments 262 also are formed about the cylindrical exterior of the head portion 252 of the lower lift element 250, these abutments being circumferentially spaced apart to fit freely into the spaces between adjacent segmental strips 228 (Figs. 6 and 7) of the carriage cup portion 224.

The lower portion of the upper lift element 253 is of generally cylindrical exterior shape and is adapted to be mounted so-axially of the cylindrical head portion 252 of the lower lift element to conform exteriorly thereto, and also to fit freely into the cylindrical cup recess defined by the lower portions 230 of the cup strips 228. The upper lift element also has an integrally formed conical wall portion 254 extending upwardly and outwardly from the upper edge of its exteriorly cylindrical lower portion. The inner face of the upper lift element 253 above a central opening 256 therein is frusto-conical. The frusto-conical wall portion 254 is notched out to form digital segments 257 which, in the lowered position of the lift member 22 shown in Fig. 6, are adapted to have flush inter-fitting relation with the conically curved upper surfaces 229 of the segmental cup strips 228 (Figs. 6 and 8). In such lowered position of the lift member 22 the complementary frusto-conical surface of the upper lift element and the upper surfaces 229 of the cup strips 228 define the frusto-conical feed cup recess 21.

A plurality of rounded abutments 263 similar to the abutments 262 extend radially outward from the cylindrical lower portion of the upper lift element 253, and register with the rounded abutments 262 of the lower lift element 250 to be supported thereon. Screws 264 (Fig. 7) passing upwardly through holes in the lower abutments 262 are screwed into threaded holes provided therefor in the upper abutments 263 to secure the upper and lower lift elements together.

The lower end of the cylindrical lower portion of the upper lift element inwardly of the abutments 263 is removed (Figs. 6 and 8) to provide an annular, roller receiving recess 265, complementary to the annular recess 255 in the lower lift element 250. Radially disposed notched abutments 267 (Fig. 6), similar to the notched abutments 258 on the lower lift element 250, extend across the annular recess 265 to overlie the lower notched abutments 258 and to grip the wire ring 260 upon which the roller disks 261 are threaded. The roller disks 261 are substantially tangent to the conical inner face of the upper lift element 253 around the central opening 256 therein so that a pear dropped stem end down into the feed cup recess 21, and engaging rollers 261, will tend to gravitate to the lowest possible position in the cup recess, thereby centering the stem end of the pear in the annulus of rollers 261.

A cam follower roller 268 (Figs. 4, 6 and 9) is journaled to rotate freely on a pin 269 mounted transversely across the lower end of the lower lift element 250, and is secured in position by set screws 270. The ends of the pin 269 extend axially beyond the sides of the lower lift element 250 (Figs. 4 and 8) and ride in slotted holes 271 (Figs. 6 and 9) in the sides of the tubular lower portion 225 of the carriage 20. The end of each roller supporting pin 269 toward the center of the closed carriage path also extends beyond the tubular lower carriage portion 225 into the path of the lift return cam 75 (Fig. 4) mentioned previously herein.

Normally, gravity will return the lift member 22 to its lowered position shown in Fig. 6 as the lift actuating roller 268 rides downwardly off the lift cam 70, but in the event that some pear pulp or other obstruction should resist seating of the lift member, the lift return cam 75 will engage the extending portion of the roller support pin 269, thereby tending to force the lift member 22 to return to its fully lowered position. During elevation and return of the lift member 22, the carriage support rollers 64 and 69, riding between their respective pairs of tracks 61, 62, 67 and 68, retain the carriage 20 against vertical displacement.

Each pair of feed carriage double sprocket drive wheels 85 and 88 has a plurality of vertically aligned pairs of rounded notches 272 (Figs. 4, 5 and 18) formed in the peripheries thereof to receive the tubular carriage body portions 225 therein. Each of such carriage receiving notches is flanked by a pair of rounded notched extensions 273 and 274 to receive the chain rollers 249 adjacent the tubular carriage body portion 225. A vertically aligned pair of rounded intermediate notches 275 also is provided in the peripheries of each pair of double sprocket wheels 85 and 88 midway between adjacent pairs of body receiving notches 272 to receive the link roller 249 around the center pin 244 which interconnects each pair of links 241 and 245 (Figs. 6 and 18). Thus, the carriages are positively supported by the sprocket wheels 85 and 88 as they are carried around the rounded end portions of their closed path, and by the tracks 60, 61, 67 and 68 as they travel along the straight side portions of such path.

*Transfer mechanism*

Each of the transfer devices 23 (Figs. 10 and 16) has a hollow body 280 shaped somewhat like an inverted bottle, with the mounting side 281 thereof flattened. A pair of elongated slotted openings 282 and 283 (Fig. 10) are provided lengthwise of the flattened side 281 to provide operating clearance for a plurality of operating elements to be described later herein. A flat top closure plate 284 is secured by screws 285 (Fig. 10) across the otherwise open upper end of each transfer device body 280, and extends slightly beyond the upper end of the body toward the center of the closed path of the transfer devices.

The two cam follower guide rollers 134 and 135, mentioned previously herein, are pivotally mounted on posts projecting upwardly from opposite ends of this projecting portion of the cover plate 284. The larger roller 135 is mounted on the rearward end of the cover plate 284 and is adapted to have rolling contact with the marginal edge of the lower cam plate 130, while the smaller roller 134 is mounted on the forward end of the cover plate 284, and is adapted to roll along the marginal edge of the upper cam plate 131 as the transfer devices 23 travel around their closed path. The cam plates 130 and 131, in conjunction with the short supplemental cam plate 137, are shaped to maintain constant rolling contact with both rollers 134 and 135, and to firmly position the transfer devices with their lateral vertical median planes substantially normal to their direction of movement at all times throughout their course of travel.

A pair of short, rectangular chain connecting bars 288 and 289 (Fig. 10) are secured by screws 290 to abutments provided therefore on the flattened side of each transfer device body portion 280 near the lower and upper ends thereof, respectively. The lower bar 288 has one link of the lower transfer device actuating roller chain 174 secured to its lower side, so that the chain 174, of which the link is a part, will ride in the upwardly opening channel tracks 110 and 111 (Figs. 1, 2, 3, and 4) formed along the opposite sides of the transfer frame base plate 108. The upper bar 289 has one link of the upper transfer device actuating roller chain 175 secured to its upper side, so that its chain 175 will ride in the downwardly opening track channels 124 and 125 formed along the opposite sides of the transfer frame top plate 122. The transfer devices 23 are spaced apart on the chains 174 and 175 to conform to the spacing of the stemming tubes 28 of the pear preparation machine 29 which the present mechanism is intended to serve.

The transfer device support roller 129 rides along the track surface 128 (Figs. 4 and 10) machined marginally around the upper side of the transfer frame top plate 122 to support the weight of the transfer device as it travels around its irregular closed path. A transfer device guide roller 291 is mounted on the upper side of the forward end of a bracket arm 292 (Figs. 3, 4, 10 and 13) extending forwardly from the leading side of the neck portion of the bottle shaped body member 280. The guide roller 291 is adapted to ride in the downwardly opening channel tracks 112 and 113 along the opposite sides of the transfer frame base plate 108 beneath the chain guide tracks 110 and 111 therein. The guide rollers 291 are mounted well ahead of the short bars 288 and 289 which connect the transfer device drive chains 174 and 175 to the body members 280. Thus, in conjunction with the chain connections, these guider rollers 291 assist the cam follower rollers 134 and 135 on the top closure plate 284 in properly and firmly guiding the transfer devices 23 along the portions of their path where they receive the pears from the lift members 22, and also where they impale the pears on the stemming tubes 28.

A plurality of symmetrically arranged pairs of gripping finger mounting abutments 293 (Figs. 1, 2, 3, 4, 10 and 13) extend radially outward from an annular flange 294 provided around the lower end of the neck portion 295 of each transfer device body member 280. A notch 298 is provided in the flange 294 between each pair of abutments 293 and a pear gripping finger 24 is pivoted to swing in each of these notches on a pin 299 inserted through a hole in the finger, and through laterally aligned holes in each pair of abutments 293. The gripping fingers 24 are of equal number with the digital segments of the conical wall portions 254 of the upper lift element 253, and are adapted to be inter-digitated therewith and to swing freely through the spaces between the adjacent segments of said wall portion when gripping a pear lifted by the elevation of a congruently positioned lift member 22 as shown at 22a in Fig. 4. The pivotally mounted upper ends of the gripping fingers 24 are arranged in a circular pattern having a diameter large enough to cause the fingers to slope or converge inwardly toward their lower ends about a central axis of convergence when gripping a pear along its tapered sides as shown in Fig. 13. This inward sloping of the fingers is desirable both to assist in aligning the stem-blossom axis of a pear when gripping it, and also to restrain the pear against sudden release when being pushed axially downwardly from its gripped position upon separation of the fingers in a manner to be described later herein.

An inwardly extending arm 300 is formed integrally with the upper end of each gripping finger 24 in the nature of a bell crank lever. The inner end of each arm 300 is rounded as at 301 (Figs. 10 and 13) and is seated between a pair of radially extending flanges 302 around the lower end of a finger actuating tube 303. The tube 303 is mounted for axial slidable movement in the round bore of the neck portion 295 of the body member 280, and a guide bushing 304 is soldered in place in the tube 303 substantially midway of its length. A fitting 305 having a lower sleeve portion 307 and an integrally formed, substantially semi-circularly curved wall portion 308 extending upwardly therefrom is secured, by a set screw 309, on the upper end of the finger actuating tube 303 to move therewith within the hollow transfer device body 280.

An abutment 306 (Figs. 10 and 13), formed on the fitting 305, is adapted to be engaged by a gravity actuated, cam released latch 310 pivotally mounted on a pin 311 to swing freely in the lower slotted opening 282 in the transfer device body. The latch 310 is mounted so that when it is in a generally upright position as shown in Fig. 13, its center of gravity will be well to the right of its axis of pivotal support, thereby normally urging the lower end of the latch to swing into the alotted opening 282. The latch 310 has a notched lower end 312 adapted to latch over the abutment 306 on the walled fitting 305 as shown in Fig. 10 when the finger actuating assembly, consisting of the tube 303 and the walled fitting 305 is moved downward a sufficient distance to bring the abutment 306 below the inner edge of the notch 312. The latch 310 holds the gripping fingers separated during the portion of their travel between the impaling of one pear on a stemming tube and the gripping of the next pear. A cam actuated latch releasing roller 316 (Figs. 3, 4, 10 and 13) is pivotally mounted on the latch 310 in a position to be engaged by the latch releasing upper surface of the combined latch release and finger actuating cam 153 as the transfer device 23 upon which the latch is mounted moves into congruent relation with a feed cup recess 21 of a carriage 20.

The semi-cylindrical wall portion 308 of the fitting 305 is of considerably larger internal diameter than the tubular sleeve portion 307, and a pair of spring engaging ears 313 (Figs. 12 and 16) extend laterally from opposite sides of the wall 308. Each of these ears has formed on its underside a spring retaining button 314 (Fig. 12) adapted to fit into the upper end of one of a pair of helical compression springs 315. The lower ends of the springs 315 are supported on the heads of a pair of spring adjusting screws 317, the threaded shanks of which are screwed through correspondingly threaded holes in the shouldered offset of the transfer device body 280 adjacent its neck. The lower ends of the spring adjusting screws 317 are squared to receive an ordinary wrench for adjustment of the spring pressure, and lock nuts 318 are provided to retain the screws in adjusted position.

A cam actuated U-shaped yoke 319 (Figs. 10, 12, 13 and 16) has the ends of its legs pivotally mounted on a bolt 320 which is inserted transversely of the transfer device body portion 280. The wall of the transfer device body portion 280 is deformed somewhat at 321 (Figs. 1, 3, 4, 10, 12 and 16) on opposite sides thereof to provide a bay with parallel sides for mounting the yoke 319 therebetween. The legs of the yoke 319 span the lower portion 307 of the walled fitting 305, and a pair of rollers 322 are rotatably mounted (Figs. 10 and 12) on the sides of the yoke legs facing the portion 307. A pair of short horizontal channel tracks 323 (Fig. 12) are formed exteriorly along opposite sides of the lower portion 307 of the walled fitting 305 to receive the yoke-mounted rollers 322. The finger actuating cam follower roller 152 mentioned previously herein, is journaled on a pin 325 (Figs. 10 and 12) secured by a set screw 327 in the transverse portion of the yoke 319.

The pear positioning and pushoff spike assembly 25 (Figs. 3, 4, 10, 11, 12 and 13), herein sometimes referred to generally as the "spike," has a tubular portion 330 mounted for axial slidable movement in the guide bushing 304 in the finger actuating tube 303. A threaded rod 331 is screwed into the interiorly threaded lower end of the tubular portion 330, and a sharpened fruit penetrating spike portion 332 is welded to extend axially from the lower end of the threaded rod 331. The pusher disk 31, referred to previously herein, is secured transversely of the end of the threaded rod 331 and concentrically therewith. The threaded rod 331, with its supported spike portion 332 and pusher disk 31, is secured in axially adjusted position in the tubular portion 330 by a lock nut 333. A rack portion 334 (Figs. 10 and 11) is welded to the upper end of the tubular spike portion 330 to extend upwardly therefrom, and faces a similarly toothed fixed rack 335 secured by screws 337 and 338 lengthwise of the upper elongated opening 283 in the transfer device body 280.

A floating pinion 339 (Figs. 10 and 11) is rotatably mounted on a pin 340 secured transversely of a vertically slidable box frame 341. The slidable box frame 341 is mounted to enclose both of the racks 334 and 335 to retain the floating pinion 339 constantly in mesh with both racks. The box frame 341, as best shown in Fig. 10, has an upright rear plate 342 adapted to have sliding engagement with the flat rear side of the rack extension 334, and a pair of box frame side plates 343 and 344 are connected by screws to the vertical edges of the rear plate 342. The side plates are formed integrally with a front plate 345 (Fig. 11), adapted to have slidable engagement with the flat rear side of the fixed rack 335.

A pair of laterally extending guide flanges 347 (Fig. 11) project from opposite sides of the front plate 345 and ride in vertical channel tracks provided by rabbeted grooves 348 formed along the upright sides of the upper elongated opening 283 in the inner side of the bottle-shaped transfer device body member 280. The flanges 347 are retained in the tracks by a pair of strips 349 secured to the body member 280 by screws 350 to extend over the rabbeted track grooves. A spike actuating cam follower roller 351 is rotatably mounted on a pin 352 secured by a set screw 353 in a hole in the front plate 345 of the box frame 341.

A coil spring 354 is connected in tension from the box frame 341 (Figs. 10, 11, 12 and 13) to the walled, spring pressed fitting 305 on the upper end of the finger actuating tube 303. The tension on the spring 354 is sufficient to drive the spike portion 332 into a pear and thereafter to push the pear to an initially partly impaled condition on a stemming tube 28 of the pear preparation machine in a manner to be described later herein, but is sufficiently less than the pressure exerted by the finger closing springs 315, so that the pressure of the spike will not displace a pear gripped by the fingers 24.

The tension of the spring 354 tends to draw the box frame 341 downwardly, rolling the pinion 339 downwardly along the fixed rack 335 and driving the rack extension portion 334 of the spike assembly downwardly through a distance equal to twice the travel of the box frame. The axial movement of the walled fitting 305 of the finger actuating assembly during its operation is slight as compared to the length of the coil spring 354, and therefore does not adversely affect the actuation by the latter of the spike 25 upon an operation movement of the box frame 341. Also, the relatively light tension of the coil spring 354 does not appreciably affect the actuation of the gripping fingers 24 by their relatively strong compression springs 315.

*Stem end trim mechanism*

For trimming a predetermined portion from the stem end of each pear before it is impaled on a stemming tube 28, the stem end trim mechanism 30 (Figs. 2, 3, 5, 14, and 17) is mounted with a rotary trimming blade 360 thereof adapted to be moved to vertically adjusted position in the path of each pear as the pear is carried in the gripping fingers of a transfer device 23 around the rounded end zone of its path between the feed carriages 20 and the stemming tubes 28. The stem end trim mechanism has an electric drive motor 361 mounted with its drive shaft upright, and is connected by flexible conductors 362 to a suitable source of electricity for constant running during operation of the pear handling mechanism with which it is associated.

The rotary trimming blade 360 is secured to the upper end of the drive shaft of the motor 361 for rotation therewith, the blade preferably having a flat upper face (Fig. 14) to prevent the blade from exerting any camming effect on the pears during severance of the stem end portions thereof. The motor 361 is mounted on a floating plate 363 (Figs. 2 and 14) having ears 364 extending laterally from opposite sides thereof. A pair of tubular guide members 365 are welded in place in openings in the ears 364, with the axes of the tubes 365 normal to the plane of the floating motor mount plate 363.

The tubular guide members 365 are slidably mounted on a pair of upright guide studs 367 (Fig. 14), the upper ends of which are secured to a fixed support plate 368, while a spring support and lever mounting plate 369 is secured transversely across the lower ends of the guide studs 367. The fixed support plate 368 is rigidly mounted on the flanged rim 101 (Fig. 2) of the pear preparation machine 29, by cap screws 370 and tubular spacers 371. The support plate 368 has an opening 372 (Fig. 2) therein to receive the motor 360 for free reciprocative movement therein.

Rubber bumper rings 373 (Fig. 14) are mounted around the guide studs 367 beneath the fixed plate 368 to cushion the impact of the upper ends of the guide tubes 365 therewith on arresting an upward movement of the motor and blade assembly. Coil springs 374 surround the tubular guides 365, and are retained in compression between the fixed, transverse lower plate 369 and the laterally extending ears 364 of the floating motor support plate 363. The combined pressure of the springs 374 is such as to slightly more than counterbalance the weight of the motor 360 and its assembled parts, and thus normally urges the floating plate 363 with the motor and its rotating trimming blade 360 gently upwardly. For depressing the floating plate 363 and the motor driven blade assembly supported thereon, a lever 377 is pivoted on a pin 378 mounted to extend between a pair of ears 379 on the transverse lower plate 369. The cam follower roller 214, mentioned previously herein, is mounted on one end of the lever 377 to have rolling contact with the cam track 213 on the stem-end-trim actuating face cam 210, which is timed to rotate one complete revolution during the time interval between the passage of successive transfer devices 23 past a given point.

A link 380 connects the other end of the lever 377 from that bearing the roller 214 to the underside of the floating motor support plate 363, so that when the roller 214 moves onto a high portion of the cam track 213 the motor assembly will be drawn downwardly, while when the roller 214 passes over the low portion of the cam track 213, the springs 374 will urge the floating plate 363 and the motor driven blade assembly thereon gently upwardly. A down limit stop bracket 384 is mounted on a side of the floating motor mount plate 363 (Figs. 2 and 14) with its upper end bent inwardly and downwardly to overlie the fixed plate 368 and limit the downward movement of the motor driven blade assembly.

A pair of pear engaging, blade positioning arms 381 are secured in adjusted position spaced downwardly from the plane of the blade 360. The arms 381 are mounted on a block 382 secured to a band 383 clamped around the motor 361. By loosening the band 383 the block 382 and its supported arms 381 can be adjusted to a desired position on the motor, after which the band can again be tightened to secure the arms in adjusted position. The arms 381 are curved to conform to the path of the stem end of a pear gripped in the fingers 24 of a transfer device 23 as it passes around its curved end zone toward the stemming tubes 28. The arms 381 are tilted upward at a slight acute angle toward their free ends, so that as the stem end of the gripped pear is moved slidably along the arms 381, the slight down-hill slope of the arms in the direction of pear movement tends to reduce friction between the arms and the pear.

In the lowered position of the reciprocating assembly carried by the floating plate 363, the positioning arms 381, as indicated by the broken lines 381ᵃ in Fig. 14, will be well below the stem end of the longest pear apt to be encountered. Upon release of the cam follower roller 214 by the face cam 210 the coil springs 374 gently move the motor assembly upwardly until arrested, either by engagement of the curved positioning arms 381 with the stem end of a pear, or, in the absence of a pear in the transfer assembly, by engagement of the upper ends of the guide tubes 365 with the bumper rings 373.

The face cam 210 is mounted so that the motor driven blade assembly carried by the floating plate 363 will be drawn downward to its lowermost position indicated by the broken line 360ᵃ in Fig. 14 shortly after the stem end of each pear has been severed, and will release the roller 214 to allow the springs 374 to move the motor assembly upward when the blade positioning arms 381 is beneath the stem end of the next pear to be trimmed by the blade 360. After the motor assembly has been arrested in its upward movement by engagement of the curved positioning arms 381 with the stem end of a pear, as the pear is moved slidably along the slightly downwardly sloping blade positioning arms 381, the blade 360 (Fig. 14) severs the stem end of the pear in the plane of the dotted line 360ᵇ. Thus, the severance of a predetermined portion from the stem end of each pear is accurately accomplished regardless of substantial variations in the length of the pears.

Operation

In describing the operation of the illustrative embodiment of the present invention, it will be assumed that the ratios of the various gears shown in Fig. 18 are such as to: (1) move the axial centers of the gripping fingers of successive transfer devices 23 congruently with those of successive stemming tubes 28 of the pear preparation machine 29 throughout the corresponding portions of their respective paths; (2) move the axial centers of the griping fingers 23 congruently with those of successive feed cup recesses 21 throughout the corresponding portions of their respective paths; (3) rotate the face cam 210 so as to allow the springs 374 to elevate the motor driven blade assembly of the stem end trim mechanism 30 as each successive pear is brought into position over the curved positioning arms 381; (4) lower the motor driven blade assembly of the stem end trim mechanism 30 after each stem end trimming cut has been completed; and (5) also to cause the pear positioning apparatus 33 to discharge one pear stem end down centrally into each feed cup recess 21 as it passes therebeneath.

With such gear arrangement, and such adjustment as may be required by means of the adjustable coupling 168 (Fig. 18) and the gear 183 on the shaft 81, all of these mechanisms will be operated in properly timed sequence upon rotation of the gear 157 of the pear preparation machine. In operating the machine with the various mechanisms thus timed, as each pear is discharged stem end down from the positioning apparatus 33 it drops into a feed cup recess 21 positioned to receive it. The annulus of freely rotating stem end guide rollers 261 mounted to surround the central opening in the lower end of the conical feed cup recess 21, eliminates frictional engagement of the stem end of the pear with the wall of the cup recess in this zone of the cup. Thus the rollers assist in guiding the stem end of the pear into centered position in the feed cups and centrally of the annulus of rollers.

The pear remains in this stem-end-centered position as it is carried along the straight outer side 386 of the closed path of the feed carriages. An operator preferably is stationed adjacent this straight side portion of the path of the feed carriages to observe that the feed cups are all provided with pears properly positioned therein, and to replace any pears which appear unsuited for processing.

Such operator can of course hand feed the pears to the cup recesses if desired, and such hand feeding is readily accomplished since the operator does not have to work in close co-ordination with the machine as is the case with some pear preparation machines. However, the present mechanism is designed for extremely high output, and when operating at the speeds of which it is capable machine feeding is preferred.

The pears are carried in the feed cup recesses 21 around the right hand rounded end zone 387 (Fig. 5) of their closed path, and then enter the straight portion 388 of their path which extends beneath the corresponding straight portion of the closed path of the transfer devices 23. As the feed carriages 20 travel around the rounded end portions of their path (Fig. 5), the plate portions 221 of adjacent carriages are permitted to overlap by reason of their alternate top and bottom relieved end portions 222 and 223 (Fig. 6).

As each carriage, with a pear in its feed cup recess 21, enters the straight zone 400 (Fig. 17) of its path where its upright feed cup axis moves in alignment with the axis of convergence of the gripping fingers of one of the transfer devices 23, the cam follower roller 268 on the lower end of the lift member 22 is engaged by the lift cam 70 (Figs. 4 and 17). This elevates the lift member 22, with the pear in stem-end-centered position thereon (Figs. 3 and 8). This brings the digital segments 257 of the lift member into interdigitated relation with the gripping fingers 24, and positions the pear with its bulb end within the gripping fingers 24. At this stage of their travel the gripping fingers 24 are held in open or expanded condition by the gravity actuated latch 310, which is then in the latching position shown in Fig. 10. The stem end of the pear, being centered in the lift cup recess 21, will then lie along the axis of convergence of the gripping fingers 24 of the transfer device, but the stem-blossom axis of the pear will be tilted from the vertical since the bulb end of the pear will be resting against the conical inner surface of the upper end of the lift member.

As the lift member 22 reaches its uppermost position and the lift actuating roller 268 begins its travel along the horizontal upper edge of the lift cam 70 (Fig. 17) the pointed leading end of the combined latch release and finger actuating cam 153 (Figs. 3, 13, and 17) enters the space between the finger actuating cam follower roller 152 (Figs. 10 and 12) on the finger actuating yoke 319, and the latch release roller 316 on the latch 310. Approximately at the same time that the under side of the cam 153 engages the finger actuating roller 152, the upwardly sloping upper surface of this cam 153 engages the latch releasing roller 316, swinging the latch 310 in a counterclockwise direction from its position illustrated in Fig. 10 to the released position shown in Fig. 13. Engagement of the finger actuating lower surface of the cam 153 with the finger actuating cam follower roller 152 as the latch is released prevents any violent upward movement of the finger actuating tube 303 and its associated mechanism under the biasing action of the springs 315 (Fig. 12).

The finger actuating roller 152 then rolls into a depression 390 (Fig. 17) in the underside of the latch release and finger actuating cam 153, the upper surface of the cam 153 retaining the latch 310 in releasing position throughout the remaining length of the cam 153. The entrance of the roller 152 into the depression 390 in the cam 153 allows the roller 152 to move upwardly, under the action of the springs 315 to elevate the finger actuating tube 303 and close the fingers 24 about the bulb end of the pear in the lift device. This centers the bulb end of the pear in the fingers, and brings the pear into position with its stem blossom axis substantially upright and co-incident with the axis of convergence of the gripping fingers 24, but may displace the stem end of the pear slightly from its previously centered position in the annulus of rollers 261.

In order to re-center the stem ends of such pears, the gripping fingers are thereafter opened momentarily by a second rise 391 (Fig. 17) in the under surface of the cam 153, and then are again closed by the action of the springs 315 as the lift roller 268 rides off the upwardly sloping rear or left hand end of the under side of the latch release and finger actuating cam 153 as shown in Fig. 17, at which time the latch releasing roller 316 also rides off the terminal end of the cam 153.

After the first gripping action by the fingers 24, when the pear is released momentarily by the fingers, as the finger actuating roller 152 rides onto the second rise 391 of the cam 153, the bulb end of the pear does not have time to drop back against the conical wall of the lift member, and the pear remains substantially upright, supported on its stem end by the annulus of rollers 261. Therefore, when the fingers 24 again close to grip the pear, it will be well centered in the gripping fingers with its stem-blossom axis substantially co-incident with the axis of convergence of the gripping fingers. While only one depression 390 is shown in the under side of the cam 153, it is obvious that additional depressions of desired depth may be provided to cause any required number of releasing and re-gripping actuations of the fingers in the event that a run of pears of extremely non-uniform configuration should be encountered, and thus make difficult their accurate axial alignment in the gripping fingers.

After the pear has been gripped for the final time by the fingers 24, the lift cam 70 allows the lift roller 268 to return to its normal lowered condition shown in Fig. 6, and in order to insure such return, the lift return cam 75 will engage the projecting end portion of the roller pivot pin 269 in the event that the lift member 22 should be prevented from returning to its fully lowered condition due to the entrance of pear pulp or other such matter between adjoining portions of the lift member 22 and the carriage 20.

During the gripping and re-gripping of the pear by the fingers 24, the spike assembly 25 will be maintained in its maximum raised position, clear of the pear as shown in Figs. 10 and 13, by the spike actuating roller 351 riding on the elevated upper edge portion 394 (Fig. 17) of the spike elevating cam 144 (Figs. 10 and 17). After the transfer device 23 has advanced to where the gripping fingers 24 have closed for the final time to grip the pear, the upper edge of the spike elevating cam 144 slopes downwardly at 392 (Fig. 17) to the level 396, which permits the pointed spike portion 332 to be driven its full length into the calyx end of the pear under the impulse of the coil tension spring 354 (Fig. 10) until its downward movement is arrested by engagement of the pusher disk 31 with the butt end of the pear. However, in the event that no pear should be gripped by the fingers of any transfer device, the portion 396 of the spike elevating cam will not allow the spike assembly to be lowered far enough at this stage to strike the stem end trimming blade 360.

The pear in this gripped and spiked condition then is carried around the curved end zone 393 (Figs. 5 and 17) of the closed path of the transfer devices, which is at the left as shown in Fig. 5, and approaches the stem end trimming mechanism 30. As the stem end of the pear is carried over the curved blade positioning arms 381, the stem-end-trim actuating roller 214 (Figs. 14, 17 and 18) rides over the low portion of the cam track 213 on the face cam 210, thereby allowing the vertically movable floating plate 363 (Fig. 14) and the motor driven blade assembly thereon to be raised by the action of its compression springs 374, bringing the spaced, curved, parallel, positioning arms 381 gently against the stem end of the pear, and arresting the upward movement of the motor mounted trimming blade 360. The spike 25 and the gripping fingers 24 prevent displacement of the pear by its engagement with the blade positioning arms 381. The stem end of the pear then slides along the relatively slightly downwardly sloping positioning arms until it is severed by the rotating trimming blade 360, the slight slope of the positioning arms tending to reduce their frictional engagement with the pear. Upon completion of the stem end trimming or bobbing cut, the motor driven blade assembly is drawn downward by the roller 214 passing onto the elevated portion of the cam track 213 (Figs. 14 and 17), and the transfer device with the trimmed pear gripped thereby is carried on around to the curved side portion 395 (Figs. 5 and 17) of its path where the pear travels congruently with a stemming tube 28. As each transfer device 23 moves onto this portion 395 of its path, the guide roller 291 (Figs. 1, 2, 3, 4, 10 and 13) on the forwardly extending bracket 292 on the transfer device enters the roller guide track channel 113 (Figs. 1, 2, 3, and 4) along the underside of the transfer frame base plate 108 to assist the guide chain mounting bars 288 and 289 and the rollers 134 and 135 on the transfer device in guiding the pear with its stem blossom axis congruently with a stemming tube.

Approximately at the same time the pear is brought into congruent relation with the stemming tube, the upper edge of the spike elevating cam 144 slopes downwardly as at 397 (Fig. 17) to clear the spike actuating roller 351 and thus free the spike 25 for downward travel, under the impulse of the tension spring 354. However, the gripping fingers 24 still retain the pear momentarily against downward movement. After the spike has thus been freed for downward travel, the finger actuating roller 152 engages the downwardly sloping leading end of the finger opening and latching cam 151 (Figs. 2, 3, and 17), which forces the gripping fingers apart, thereby releasing the pear for immediate downward movement under the spring biased impelling action of the pusher disk 31 of the spike assembly. This simultaneous opening of the fingers 24 and the downward movement of the pear under the spring biased action of the pusher disk 31 tends to slide the bulb end of the pear downward along the gripping fingers 24 as they open, which assists in guiding the pear to an initial axially impaled condition on the stemming tube 28 (Fig. 2).

This initial impaling action under the relatively light tension of the coil spring 354, causes the pear to be penetrated at opposite ends of its stem blossom axis by the stemming tube 28 and the spike portion 332, thereby securing the pear firmly against axial displacement during the final impaling thrust. After this initial impaling operation, the spike actuating roller 351 engages the downwardly sloping leading edge of the spike depressing cam 32 (Fig. 17) which forces the spike assembly downward, and pushes the pear to fully impaled condition on the stemming tube, in which fully impaled position the pear is entirely below the gripping fingers 24.

Thereafter the upper edge of the spike elevating cam 144 and rearward edge of the spike depressing cam 32 slope upwardly as at 398 (Fig. 17), the spike elevating cam again elevating the spike 25 to its uppermost position.

It will be noted in Fig. 17 that the finger opening and latching cam 151 has a portion 151ᵃ of maximum depth adjacent its leading end. This leading portion of the cam 151 forces the finger actuating roller 152 downward, opening the fingers 24, and moving the finger actuating tube assembly to a position where the notched lower end of the latch 310 will clear the upper edge of the abutment 306 to allow the latch to swing, by gravity, over this abutment, thereby latching the gripping fingers 24 in their open condition (Fig. 10). The straight remaining portion 151ᵇ of the cam 151 as shown in Fig. 17, namely the portion to the left of its portion of maximum depth, is provided merely as a safety measure to prevent the fingers from again closing during the portion of their travel where the spike is being elevated clear of the impaled pear in the event that the latch 310 should fail to engage.

After the pear has been impaled on a stemming tube 28 and the spike 25 has been elevated to its maximum height clear of the pear, the transfer device, with its gripping fingers latched open, passes around the curved end zone 399 (Figs. 5 and 17) of its closed path, which is at the right as shown in Fig. 5, and again returns to its starting point over a feed cup to repeat the procedure described herein.

While we have illustrated and described a preferred embodiment of the present invention, it will be understood that various changes and modifications may be made in the details thereof without departing from the spirit and scope of the invention as set forth in the appended claims.

Having thus described the invention what we claim as new and desire to protect by Letters Patent is as follows:

1. In a fruit handling mechanism a feed receptacle of frusto-conical form having an unobstructed opening at its smaller end whereby said receptacle is adapted to receive a pear moving stem end first thereinto, and means for guiding and centering the stem end of a pear entering said receptacle comprising a plurality of freely rotatable rollers mounted within the smaller end of said receptacle at the sides of said opening in position to engage and provide rolling centering support for the stem end of an entering pear.

2. In a fruit handling mechanism an upwardly open, substantially frusto-conical feed receptacle having a central opening in the lower end thereof adapted to receive an end of a pear for centering therein, and a plurality of rollers mounted for free rotation about said opening, the peripheries of said rollers being exposed interiorly of said receptacle to provide rolling guiding support for a pear gravitating toward said centering opening.

3. In a pear feed mechanism, a vertically disposed feed receptacle comprising a frusto-conical wall portion having an opening at its smaller end whereby said receptacle is adapted to receive a pear stem end down therein, and a plurality of guide rollers mounted at the sides of said opening with the pear contacting portions of their peripheries disposed in substantially tangential relation to the plane defined by said frusto-conical wall portion for rolling guiding contact with a pear gravitating stem end first into said receptacle.

4. In a fruit handling mechanism a vertically movable lift member comprising an upper lift element having a substantially frusto-conical wall defining an upright, open recess adapted to receive a pear gravitating stem end first therein, a tubular lower lift element secured to said upper lift element concentrically with the recess therein, a roller receiving space being provided adjacent the juncture of the upper and lower lift elements concentric with the axis of the lower lift element, a plurality of freely rotatable rollers mounted concentrically in said roller receiving space, the peripheries of said rollers being exposed interiorly of the recess to have rolling engagement with a pear gravitating stem end first into said recess.

5. In a fruit handling mechanism, a feed carriage comprising a body portion, a plurality of segmental strips converging downwardly from the marginal edge of an opening in said carriage body portion, a lift member mounted for vertical movement in said opening, a plurality of upwardly diverging, spaced wall portions mounted about the upper end of said lift member to define a substantially frusto-conical pear receiving recess, and adapted, in a lowered position of said lift member, to fit flush between and merge with adjacent converging segmental strips of said carriage body, said lift member having a downwardly extending portion mounted for slidable movement in said carriage and adapted to be engaged by a machine element for elevating the lift member together with a pear supported in the pear receiving recess therein.

6. In a fruit handling mechanism, a feed carriage mounted for movement along a predetermined path, a lift member mounted for relative vertical movement on said carriage, portions of said carriage and of said lift member co-operating to define an axially upright, substantially frusto-conical recess adapted to receive a pear stem end down in axially tilted position therein, roller guide means mounted around a lower portion of said frusto-conical recess to have rolling, centering engagement with the stem end of a pear gravitating stem end first into said recess, drive means mounted to move said carriage in a direction normal to the recess axis, and actuating means mounted to elevate said lift member with a pear in stem end centered position therein as said carriage moves in a direction normal to the recess axis.

7. In a fruit handling mechanism, a substantially frusto-conical feed receptacle adapted to receive a pear stem end down therein, spaced convergent portions of said frusto-conical feed receptacle being adapted to support a pear and being movable relatively to the remainder of said frusto-conical feed receptacle, and a pear gripping device having a plurality of pear gripping fingers thereon adapted to enter the spaces between said spaced pear support portions upon movement of the latter into the plane of said fingers to thereby grip a pear supported thereon.

8. In a fruit handling mechanism, a substantially frusto-conical feed receptacle adapted to receive a pear stem end down therein, convergent spaced portions of said feed receptacle being vertically movable to elevate a pear positioned in said feed receptacle, and a pear gripping device having a plurality of gripping fingers thereon adapted to enter the spaces between said spaced portions upon elevation of the latter into the plane of said gripping fingers to thus grip a pear elevated thereby.

9. In a fruit handling mechanism, a substantially frusto-conical feed receptacle having a digitate wall adapted to receive a pear stem end down therein, said digitate wall being vertically movable to elevate a pear positioned in said feed receptacle, a pear gripping device having a plurality of gripping fingers thereon adapted to enter into interdigitated relation with said wall portion upon elevation of the latter into the plane of said gripping fingers, and means for actuating said fingers into said interdigitated condition to grip a pear elevated by said feed receptacle.

10. In a fruit handling mechanism a feed carriage mounted for movement along a predetermined path, drive means mounted to advance said carriage continuously along said path, a substantially frusto-conical feed cup having a digitate wall mounted on said carriage and relatively movable in a direction normal to the path of carriage movement, means for moving said cup with a pear therein, and a plurality of gripping elements adapted to have interdigitated relation with said cup, upon movement of the latter into the plane of said gripping elements to thereby grip the bulb portion of a pear supported in said cup.

11. In a fruit handling mechanism a feed carriage mounted for movement along a horizontal path, drive means mounted to advance said carriage continuously along said path, a substantially frusto-conical feed cup having a digitate wall mounted on said carriage and vertically movable relatively thereto, means for elevating said cup to lift a pear therein, and a plurality of gripping elements adapted to have interdigitated relation with said cup upon elevation of the latter into the plane of said gripping elements, and means for actuating said gripping elements when so interdigitated to grip the bulb portion of a pear lifted by said cup.

12. In a fruit handling mechanism, a feed carriage having a digitated substantially frusto-conical feed cup thereon, said carriage being adapted to move along a predetermined path, digitated gripping means mounted for movement toward a common axis to a position of downward convergency and mounted for movement along a predetermined path a portion of which conforms to a portion of the carriage path, drive means mounted to advance said gripping means congruently with said feed cup along conforming portions of their respective paths, means for moving said gripping fingers toward said axis to said position of downward convergency upon registration of said feed cup therewith, and means for relatively moving said feed cup and said congruent gripping means in a direction normal to their paths of congruent movement into interdigitated relation with each other.

13. Fruit handling mechanism comprising a feed carriage adapted to travel along a predetermined path, a substantially frusto-conical feed cup on said carriage adapted to receive a pear stem end down therein, a plurality of circumferentially spaced digitate pear support elements disposed about the frusto-conical wall of said feed cup normally to conform thereto, a transfer device mounted to travel along a predetermined path a portion of which coincides with a portion of the feed carriage path, a plurality of dependent gripping fingers mounted on said transfer device for movement toward a predetermined center, and to a position of downward convergency, a drive means operatively interconnecting the feed carriage and the transfer device to move the feed cup congruently with the gripping fingers throughout coinciding portions of said respective paths, and means for elevating the support elements of the feed cup while the latter is moving congruently with the transfer device to lift said digitate elements into interdigitated relation with the gripping fingers.

14. In a fruit handling mechanism a feed carriage mounted for movement along a predetermined path, a lift member mounted for relative vertical movement on said carriage, said carriage and lift member having digitate portions arranged to define an axially upright recess adapted to receive a pear stem end down therein, drive means mounted to move said carriage in a direction normal to the recess axis, gripping means having opposed portions thereof adapted to move congruently with said lift member, means for moving said gripping means into interdigitated relation with said digitate carriage portions, and means for actuating said gripping means to a position wherein they converge downwardly in said interdigitated relation to move portions thereof into gripping centering engagement with the bulb portion of a pear in said recess, thereby to bring the stem-blossom axis of the pear into alignment with the upright axis of the recess.

15. In a fruit handling mechanism, a plurality of feed cup carriages connected for movement along a predetermined path, drive means mounted to advance said carriages along said path, each carriage comprising an axially upright, substantially frusto-conical cup adapted to receive a pear endwise therein, said frusto-conical cup having mergeable interdigitated fixed and movable portions, guide means disposed about the upright central axis of said frusto-conical cup to center the lower end of a pear therein along the upright cup axis thereof, means for elevating the movable interdigitatable portions of said frusto-conical cup and said guide means to lift a pear in end centered condition from the fixed interdigitatable portions of said frusto-conical cup, a plurality of downwardly convergent gripping elements adapted to receive therebetween and substantially to conform to a downwardly tapering portion of a pear so lifted, and means for moving the gripping elements toward the upright axis to grip and center the upper portion of the pear as lifted along said cup axis.

16. In a fruit handling mechanism a feed carriage, a lift member mounted for relative vertical movement on said carriage, spaced wall portions disposed around the upper end of said lift member to define a recess adapted to receive a pear gravitating stem end down in axially tilted position therein, a plurality of rollers mounted interiorly of the recess of said lift member to have rolling, centering engagement with the stem end of a pear gravitating stem end first into said recess, drive means mounted to move said carriage along a horizontal path, actuating means mounted to elevate said lift member with a pear in stem end centered position therein as said carriage moves along its horizontal path, gripping means having opposed portions thereof adapted to register with the spaces between the wall portions of said lift member on an elevation of said lift member, and actuating means mounted convergently to move said opposed gripping means portions through said spacer to grip and center the bulb end of a pear in said recess thereby to bring its stem-blossom axis upright.

17. In a fruit handling mechanism a stemming tube adapted to move along a predetermined path, a feed carriage adapted to move along a predetermined path laterally adjacent the path of said stemming tube, a lift member mounted on said carriage for relative movement in a direction normal to the path of said carriage, spaced wall portions mounted on said lift member to define a cup adapted to receive a pear gravitating stem end down in axially tilted position therein, actuating means mounted to elevate said lift member with a pear in stem end centered position in said cup as said carriage moves along its path, gripping means mounted to move along a path portions of which are opposite portions of the paths of the stemming tube and of the carriage, respectively, drive means mounted to move said gripping means congruently with the stemming tube and with said cup in the opposed portions of said respective paths, said gripping means having portions thereof adapted to interdigitate with the spaced wall portions of said cup on an elevation of said lift member, actuating means mounted convergently to move said interdigitated gripping means portions to grip and center the bulb end of a pear in said cup recess, means for registering the gripped pear with said stemming tube, and means for releasing and impaling the pear upon said stemming tube.

18. A fruit handling mechanism comprising in combination with a stemming tube adapted to travel in axially upright position along a predetermined path, an axially upright elevated feed cup with digitate walls adapted to travel along a predetermined path laterally adjacent the stemming tube path, a transfer device having a plurality of gripping fingers mounted thereon to converge about an upright axis, said transfer device being adapted to travel along a predetermined path portions of which are opposite portions of the paths of the upright stemming tubes and lift cups, respectively, drive means mounted to move the axis of the gripping fingers into alignment with the axes of the feed cup and of the stemming tube along the opposed portions of said respective paths, means for elevating the feed cup into interdigitated pear transferring relation with the gripping fingers when the axis of finger convergence is aligned with said feed cup axis, and means for pushing a pear from the gripping fingers to impaled condition upon a stemming tube when the axis of the latter is aligned with the axis of finger convergence.

19. In a fruit handling mechanism an upwardly opening feed cup having mergeable interdigitated fixed and movable wall segments, a lower portion of said cup being sufficiently small to center the neck end of a pear gravitating stem end down therein, an upper portion of said cup being sufficiently large to position a pear gravitating stem end down therein with its stem-blossom axis tilted from the vertical, means for elevating the movable interdigitatable wall segments and the reduced stem end centering portion of said feed cup from the fixed interdigitatable segments thereof to lift a pear in stem-end centered position therein, a plurality of gripping fingers adapted to be separated and aligned with the spaces between the movable interdigitatable wall segments of said feed cup to receive between said fingers the bulb portion of a pear elevated by said movable interdigitatable wall segments, and means for moving said fingers convergently into said spaces to grip the bulb end of the elevated, stem end centered pear, thereby to swing the stem-blossom axis of the pear to a predetermined position of alignment.

20. In a fruit handling mechanism a feed carriage mounted for movement along a predetermined path, drive means mounted to advance said carriage continuously along said path, a substantially frusto-conical feed cup mounted on said carriage to receive a pear gravitating stem end first therein, said feed cup having mergeable interdigitated fixed and movable wall portions, guide means disposed circumferentially within the lower end of said feed cup to guide the pear to stem end centered position therein, means for elevating said movable interdigitatable wall portions and said guide means relative to said carriage and said fixed interdigitatable wall portions to elevate a pear seated therein, and a plurality of gripping elements adapted to have interdigitated relationship with said movable interdigitatable wall portions upon elevation of the same into the plane thereof to thereby grip the bulb portion of the elevated pear.

21. In a fruit handling mechanism, pear conveying means, a lift member adapted to support a pear in a stem end down position, said lift member being mounted for relative vertical movement on said conveying means, means for elevating said lift member to lift a pear supported thereon relatively to said conveying means, a plurality of gripping fingers mounted to converge about an upright axis in a position defining an inverted conical plane and disposed for periodic registration with said lift member, means for separating said fingers to receive therebetween a pear lifted by said lift member when the latter is in registration therewith, means for successively opening and closing said fingers about their axis of convergence to center and grip the bulb end of a pear thus received between said fingers, and means mounted to lower the lift member after a final closing of said fingers to grip the pear therebetween.

22. In a fruit handling mechanism, a transfer device adapted to travel along a predetermined path, a plurality of gripping fingers mounted on said transfer device and adapted to close about a central axis, cam controlled finger actuating means mounted to control the opening and closing of said fingers, means for presenting a pear to said fingers, with the stem end of the pear centered on said finger axis, and cam means mounted to engage said cam controlled finger actuating means and operating during uninterrupted movement of said transfer device along said path for successively closing, opening and reclosing said fingers to grip, release and regrip the bulb end of a pear presented thereto to position the stem-blossom axis of the pear co-incident with the central finger axis.

23. In a mechanism for feeding pears, pear support means having downwardly and inwardly inclined sides, means for depositing a pear stem end down thereon with the stem end thereof between said inclined sides, and dependent means disposed above and periodically registrable with said pear support means for successively grasping, releasing and regrasping the bulb end of a pear deposited on said support while the stem end of the pear remains between said sides to promote settling of the pear to a position with its stem blossom axis bisecting the angle of inclination between the sides of the support.

24. In a mechanism for feeding pears, pear support means adapted to support a pear deposited stem end down thereon, means for guiding to a centered position the stem end of a pear deposited stem end down on said support means, and dependent means disposed above and periodically registrable with said pear support means for successively grasping, releasing and regrasping the bulb end of a pear while the stem end of the pear remains in engagement with said guiding means to center the bulb end of the pear along a predetermined line through the centered stem end of the pear thereby to bring the stem blossom axis of the pear into alignment with said predetermined line.

25. In a fruit handling mechanism a feed carriage having a feed cup thereon, said carriage being adapted to move along a predetermined path, dependent gripping means mounted to move along a predetermined path a portion of which conforms to a portion of the carriage path, drive means mounted to advance said gripping means congruently with said feed cup along conforming portions of said respective paths, means for presenting a pear in said feed cup to a congruent gripping means, and means operable during the period while the gripping means and the said cup move congruently for successively actuating said gripping means to grip, release and regrip the pear presented thereto.

26. In a fruit handling mechanism a stemming tube adapted to travel along a predetermined path, a feed carriage having a feed cup thereon, said carriage being adapted to move along a predetermined path, gripping means mounted to move along a predetermined path a portion of which conforms to a portion of the carriage path, and another portion of which conforms to a portion of the stemming tube path, drive means mounted to advance said gripping means congruently with said feed cup and with said stemming tube along conforming portions of said respective paths, means for presenting a pear in said feed cup to a gripping means, means for successively actuating said gripping means to grip, release and regrip the pear presented thereto, and pusher means mounted to push the pear from the gripper means to impaled condition on a stemming tube at a stage in their paths wherein the stemming tube is positioned in registry with the gripping device.

27. In a fruit handling mechanism, a feed carriage having a feed cup thereon, said carriage being adapted to move along a predetermined path, gripping means mounted to move along a predetermined path a portion of which conforms to a portion of the carriage path, drive means mounted to advance said gripping means congruently with said feed cup along conforming portions of their respective paths, means for presenting a pear in said feed cup to the gripping means, means operable within the period during which the gripping means and the feed cup move congruently for successively actuating said gripping means to grip, release and regrip a pear presented thereto, a spike mounted for axial movement in said transfer device, and means mounted to bias the spike toward a pear gripped in said gripping means to drive the spike into the pear and retain it against displacement.

28. In a fruit handling mechanism a stemming tube adapted to travel along a predetermined path, a feed carriage adapted to move along a predetermined path, a feed cup mounted on said carriage, gripping means mounted to move along a predetermined path a portion of which conforms to a portion of the carriage path and another portion of which conforms to a portion of the stemming tube path, drive means mounted to advance said gripping means congruently with said feed cup and with said stemming tube along conforming portions of said respective paths, means for presenting a pear in said feed cup to said gripping means, means for successively actuating said gripping means to grip, release and regrip a pear presented thereto, a spike mounted for axial movement in said transfer device, means mounted to bias the spike toward a pear gripped in said gripping means, cam means mounted to move the spike counter to said biasing means, said cam means being adapted to release the spike for biased penetration of the pear after a final regripping actuation of the gripper means, a presser element on said spike adapted to engage a pear penetrated by the spike to limit the penetration of the spike and to transmit the biasing force on said spike to the pear, means for opening the gripper means to free the pear when advancing congruently with the stemming tube for initial biased impalement thereon, and cam means mounted to push the initially impaled pear to fully impaled condition on the stemming tube.

29. The method of aligning the stem-blossom axis of a pear for impalement on the upright stemming tube of a pear preparation machine which comprises feeding a pear by gravity into a pear-receiving recess in an inverted position, centering the neck of the pear in said recess while the bulb portion thereof is free to tilt to an axially inclined position, and finally adjusting the pear axis to a substantially vertical position by gripping, releasing and regripping the bulb portion thereof from above within a time cycle less than that required for the pear to tilt by gravity from its aligned axially vertical position back to an axially inclined position.

30. The method of aligning the stem-blossom axis of a pear which comprises feeding a pear by gravity stem end first into a pear-receiving recess, centering the stem end of the pear in said recess, and gripping, releasing, and regripping the bulb end of the pear while the stem end of the pear remains within said recess, to adjust its axis to a substantially vertical position.

31. In a fruit handling mechanism a transfer device, a plurality of dependent gripping fingers mounted thereon to move to a position of convergency toward an axis, means for separating the fingers, means for presenting between the fingers when separated a pear with its stem end directed generally in the direction of said convergency, means for moving the fingers to said position of convergency to grip the pear presented therebetween and substantially to conform to the tapering sides of the pear, a centering spike having a common mounting with said gripping fingers for movement along the axis of finger convergence, and means mounted to drive the centering spike into the pear gripped by said fingers.

32. In a fruit handling mechanism a plurality of dependent gripping fingers mounted to move toward a predetermined axis in a downwardly convergent arrangement, means for separating the fingers, means for presenting a pear in a stem end down position between the fingers when separated, means for moving the fingers toward said axis to a downwardly converging position and substantially conforming to the tapering configuration of the pear presented therebetween, a centering spike having a common mounting with said gripping fingers for movement along the axis of finger convergence, means mounted to urge the centering spike toward a pear presented between said centering fingers, and cam means mounted to hold said spike clear of a pear prior to movement of the fingers to said pear gripping position, said cam means being shaped to release the centering spike for penetration of the pear after movement of the fingers to said pear gripping position.

33. In a fruit handling mechanism a plurality of gripping fingers mounted to move convergently toward an axis, means for separating the fingers, means for presenting a pear between the fingers when separated, means for convergently moving the fingers toward said axis to grip the pear presented therebetween, a centering spike having a common mounting with said gripping fingers for movement along the axis of finger convergence, a pusher adapted to engage a portion of a pear gripped by said fingers, cam means mounted to hold said centering spike and said pusher clear of a pear prior to a convergent movement of the fingers to grip the pear, said cam means being shaped to release the centering spike and the pusher after a convergent movement of the fingers to, and biasing means mounted to urge the centering spike to penetrate the pear and to urge the pear away from the fingers along the axis of finger convergence with the centering spike penetrating the pear to retain it against axial displacement.

34. In a fruit handling mechanism a feed cup mounted to move along a predetermined horizontal path, said feed cup being adapted to receive a pear gravitating stem end down therein, portions adjacent the lower end of the cup being spaced apart to receive and center the stem end of a pear therebetween, a gripping device mounted to move along a horizontal path, a portion of which is opposite a portion of the feed cup path, drive means mounted to move the griping device congruently with the feed cup along their opposed path portions, lift means mounted to elevate a stem end centered pear with the feed cup disposed in registry with the gripping device to present the bulb portion of the pear to the gripping device, actuating means mounted to actuate said gripping device to center and grip the bulb portion of the pear presented thereto, thereby to position the stem-blossom axis of the pear in a predetermined position of alignment, pusher means biased to bear against the butt end of a pear gripped by said gripping device with a force less than the restraining force of said gripping means, and means for releasing said gripping means to free the pear for axially impelled movement therefrom by the pusher means.

35. In a pear feeding and transferring mechanism, a feed cup adapted to receive a pear therein and mounted to move along a horizontal path, roller means exposed interiorly of the cup to engage and center a portion of a pear therein, a gripping device mounted independently of the feed cup and for movement along a predetermined path a portion of which is opposite a portion of the feed cup path, drive means mounted to move the gripping device congruently with the feed cup along their opposed path portions, means mounted to extend a portion of the feed cup including said roller means to present a pear in the feed cup to a gripping device when aligned therewith, timed actuating means mounted to actuate said gripping device to grip a pear presented thereto, pusher means urged to bear against the end of a pear gripped by said gripping device, thereby tending to impel the pear axially from the gripping device, and a spike portion mounted on said pusher means to extend therefrom in the direction of the urging force thereon, said spike portion being adapted to penetrate the pear to maintain it against lateral displacement.

36. In a fruit handling mechanism a transfer device, a plurality of gripping fingers mounted thereon to move convergently about an axis, means for separating the fingers, means for presenting a pear between the fingers when separated with the stem end of the pear centered on the axis of finger convergence, means for convergently moving the fingers to grip the bulb end of the pear and center it on the axis of finger convergence, a centering spike having a common mounting with said gripping fingers for axial movement along the axis of finger convergence, means mounted to drive the spike into a pear gripped by said fingers, and resiliently biased pusher means mounted to move along said axis of finger convergence, slidably to urge the pear along the fingers during separative movement thereof while pushing the pear axially outwardly therefrom with the centering spike retaining the pear against axial displacement.

37. In a fruit handling machine a moving digitated fruit feeding receptacle, a moving digitated fruit transfer device, contractible to fruit gripping condition generally conforming to the conical form of a pear, said receptacle and device having different predetermined paths of travel, means guiding said receptacle and device in congruent paths during part of their travel, means moving said receptacle and device into interdigitating relation during such congruent travel, and means operable with said transfer device and said receptacle in interdigitating relation for contracting the transfer device to fruit gripping condition.

38. In a fruit handling machine a stemming tube adapted to move along a predetermined path, a digitated fruit receptacle adapted to move along a predetermined path adjacent to said first mentioned path, a digitated fruit receiving device contractible to fruit holding condition generally conforming to the conical form of a pear, means moving said device along a path having portions in congruity with portions of the paths of said receptacle and said tube, means operable to move said receptacle into interdigitated relation with said device during congruent travel therewith, means for contracting said device to said fruit gripping condition, and means operable to move said device into registration with said stemming tube.

39. In a fruit handling machine a fruit receptacle having a digitated portion adapted to receive a pear stem end down therein, means moving said receptacle along a predetermined path, a pear transfer mechanism including a digitated pear receiving and holding device adapted to contract to pear gripping condition generally conforming to the form of a pear in stem end down position, means moving said receiving and holding device along a predetermined path a portion of which is in congruity with a portion of the path of movement of said receptacle, means operable to move said receptacle into and out of interdigitating relation with the pear receiving and holding device during congruent travel therewith, means operable when said receptacle and said device are in interdigitating relation for contracting said device to said pear gripping condition, and means actuating the pear receiving and holding device to remove the pear from said receptacle during congruent travel therewith.

40. In a fruit handling machine a stemming tube adapted to move along a predetermined path, a feed receptacle having a digitated portion adapted to receive a pear stem end down therein, means moving said receptacle along a predetermined path, a pear transfer mechanism including a digitated pear receiving and holding device, means moving said receiving and holding device along a predetermined path into and out of registry first with said feed receptacle and subsequently with said stemming tube, means operable to move said feed receptacle into and out of interdigitating relation with the pear receiving and holding device during congruent travel therewith, means actuating the pear receiving and holding device to remove the pear from said feed receptacle during congruent travel and interdigitating relation therewith, and means to subsequently transfer the pear from the receiving and holding device to the stemming tube during congruent travel therewith.

References Cited in the file of this patent

UNITED STATES PATENTS

| Number | Name | Date |
|---|---|---|
| 1,217,791 | Luther | Feb. 27, 1917 |
| 1,745,158 | Fish | Jan. 28, 1930 |
| 1,860,745 | MacDougall | May 31, 1932 |
| 1,935,739 | Freese | Nov. 21, 1933 |
| 1,951,804 | MacDougall | Mar. 20, 1934 |
| 2,135,219 | Reifsnyder | Nov. 1, 1938 |
| 2,176,333 | Elving | Oct. 17, 1939 |
| 2,242,244 | Ewald | May 20, 1941 |
| 2,284,647 | Ewald | June 2, 1942 |
| 2,300,773 | Carroll | Nov. 3, 1942 |
| 2,321,590 | Ewald | June 15, 1943 |
| 2,335,620 | Thompson | Nov. 30, 1943 |
| 2,431,310 | Coons | Nov. 25, 1947 |
| 2,468,255 | Dunn | Apr. 26, 1949 |
| 2,526,712 | Thompson | Oct. 24, 1950 |
| 2,540,345 | Pipkin | Feb. 6, 1951 |
| 2,572,773 | Slagle | Oct. 23, 1951 |